(12) United States Patent
Shimada et al.

(10) Patent No.: US 6,268,895 B1
(45) Date of Patent: Jul. 31, 2001

(54) LIQUID CRYSTAL DISPLAY DEVICE HAVING LIGHT SHIELD IN PERIPHERY OF DISPLAY

(75) Inventors: Takayuki Shimada, Yamatokoriyama; Yuzuru Kanemori, Nara; Mikio Katayama, Ikoma; Shinya Tanaka, Sakai; Takashi Ochi, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/736,426

(22) Filed: Oct. 24, 1996

(30) Foreign Application Priority Data

| Oct. 27, 1995 | (JP) | .................................................. 7-280413 |
| Mar. 21, 1996 | (JP) | .................................................. 8-065034 |
| Jul. 1, 1996 | (JP) | .................................................. 8-171533 |
| Jul. 1, 1996 | (JP) | .................................................. 8-171534 |

(51) Int. Cl.[7] .................................................. G02F 1/1333
(52) U.S. Cl. ........................................... 349/110; 349/111
(58) Field of Search ............................... 349/110, 38, 42, 349/111

(56) References Cited

U.S. PATENT DOCUMENTS

| 5,202,778 | 4/1993 | Niki . |
| 5,278,682 | * 1/1994 | Niki ........................................ 359/62 |
| 5,345,324 | * 9/1994 | Koseki et al. ............................ 359/67 |
| 5,617,230 | * 4/1997 | Ohgawara et al. ..................... 349/110 |
| 5,671,027 | * 9/1997 | Sasano et al. ............................ 349/46 |
| 5,771,083 | * 6/1998 | Fujihara et al. ....................... 349/147 |
| 5,796,449 | * 8/1998 | Song ....................................... 349/54 |

FOREIGN PATENT DOCUMENTS

| 61-32087 | 2/1986 | (JP) . |
| 4-130417 | 5/1992 | (JP) . |
| 4-307521 | 10/1992 | (JP) . |
| 07225394 | 8/1995 | (JP) . |

* cited by examiner

*Primary Examiner*—Walter Malinowski
(74) *Attorney, Agent, or Firm*—Nixon & Vanderhye P.C.

(57) ABSTRACT

A liquid crystal display device of the present invention includes: an active matrix substrate; a counter substrate; and a liquid crystal layer interposed between the active matrix substrate and the counter substrate, wherein the active matrix substrate includes a plurality of switching elements, a plurality of pixel electrodes, gate lines for supplying a control signal to the switching elements, and source lines for supplying a data signal to the switching elements, the gate lines and the source lines crossing each other, and the pixel electrodes being connected to the respective source lines through the switching elements, the counter substrate includes a counter electrode opposed to the plurality of pixel electrodes through the liquid crystal layer, the plurality of pixel electrodes, the counter electrodes and the liquid crystal layer interposed therebetween form a plurality of pixel regions, and wherein the liquid crystal display device includes a display region including the plurality of pixel regions and a peripheral region surrounding the display region, and the active matrix substrate includes a first conductive layer in the peripheral region.

15 Claims, 22 Drawing Sheets

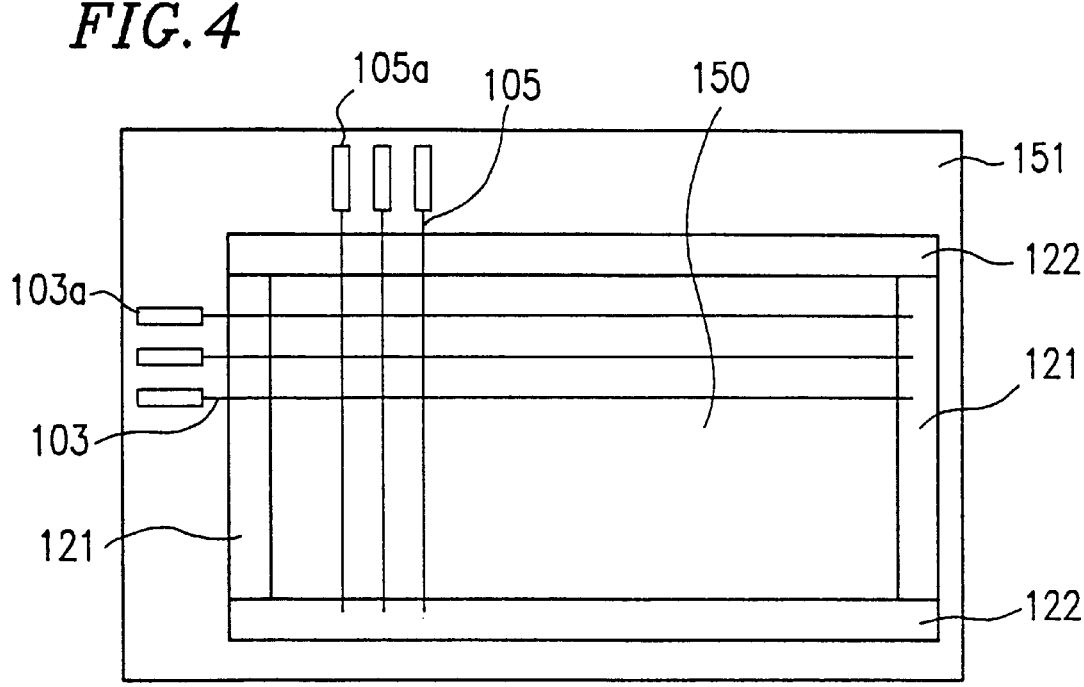
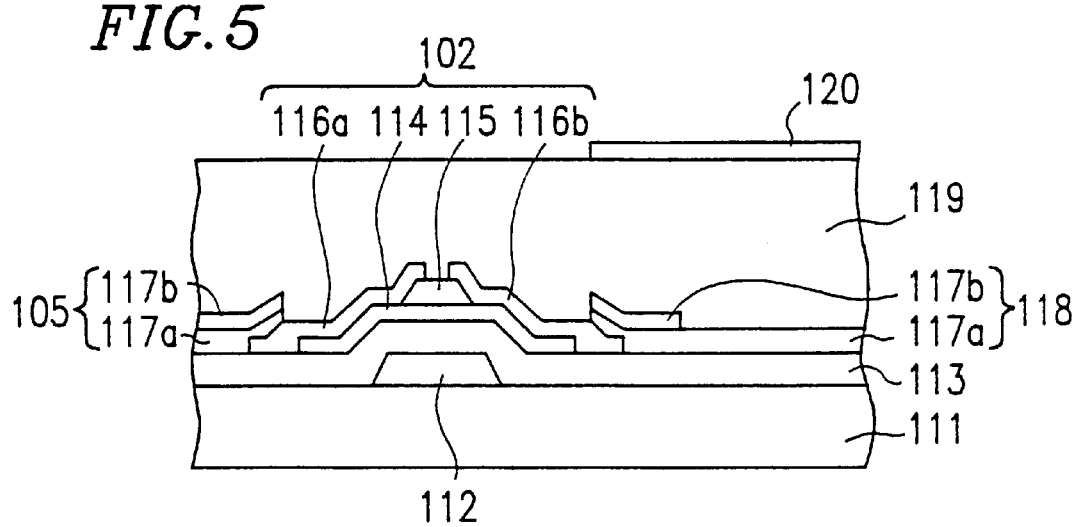

LIQUID CRYSTAL DISPLAY DEVICE HAVING LIGHT SHIELD IN PERIPHERY OF DISPLAY

BACKGROUND OF THE INVENTION

1. Field of the Invention

The present invention relates to a display device using a liquid crystal layer as a display medium.

2. Description of the Related Art

FIG. 35 shows an example of the configuration of an active matrix substrate serving as part of a liquid crystal display device, using thin film transistors (hereinafter, referred to as TFT) as switching elements. A plurality of TFTs 402 and a plurality of storage capacitors 401 connected to the respective TFTs 402 are formed in a matrix on the active matrix substrate. Each gate line 403 is connected to each gate electrode of the TFT 402. The TFT 402 is driven by a signal input to an input terminal 403a so as to be applied to a gate electrode. A source line 405 is connected to a source electrode of the TFT 402, to which a video signal input from an input terminal 405a is applied. The pixel electrode and one terminal of the storage capacitor 401 are connected to a drain electrode of the TFT 402. The other terminal of the storage capacitor 401 is connected to a common line 404 functioning as a storage capacitor counter electrode, and thus is connected to a counter electrode formed on a counter substrate when the active matrix substrate and the counter substrate are attached to each other. The active matrix substrate and the counter substrate are attached to each other so as to interpose a liquid crystal layer therebetween, thereby completing a liquid crystal display device.

In order to realize a color display in this liquid crystal display device, the configuration in which a color filter consisting of filter portions of three colors (e.g., RGB) is formed on a counter substrate is most generally adopted. In this case, a black mask is generally formed on a counter substrate so as to prevent the mixture of colors and the light leakage. The black mask prevents light leakage from a voltage-unapplied portion of the liquid crystal layer of the pixel when it is provided in the boundary region between the pixels and prevents light leakage from the peripheral region when it is provided in the peripheral region surrounding a display region. FIG. 36 shows the active matrix substrate 410a having the configuration shown in FIG. 35 which is attached to a counter substrate 410b. For simplicity, FIG. 36 does not show the storage capacitors 401, the TFTs 402 and the storage capacitor counter electrode 404 on the active matrix substrate 410a. Moreover, a black mask provided in the boundary region between pixels within a display region 450 on the counter substrate 410b is omitted in FIG. 36, and only a black mask 430 provided in the peripheral region surrounding the display region 450 is shown. The black mask 430 should be formed in the peripheral region so as to conduct a high quality display. Although not shown in FIG. 36, a suitable margin is provided between the black mask 430 in the peripheral region and the edge of the counter substrate 410b.

As described above, in the conventional color liquid crystal display device, the black mask 430 is formed along with a filter pattern (not shown) of RGB on the counter substrate 410b. The elimination of the step for forming the black mask 430 would be effective in reduction of the fabrication cost of a liquid crystal display device. Therefore, it is necessary to develop a liquid crystal display device which does not require the black mask 430 to be formed on the counter substrate. In order to achieve such a liquid crystal display device, however, light leakage from the peripheral region surrounding the display region needs to be prevented even without using a black mask formed on the color filter substrate.

Moreover, the black mask 430 made of a resin does not have sufficiently high optical density value, and has inferior reliability to that of a black mask made of a metal. However, the black mask 430 made of a light shielding metal has the following problems.

The active matrix substrate 410a and the counter substrate 410b are attached to each other while a sealing resin is applied to the peripheral region of any one of the substrates. In the peripheral region, an electric field is generated between the black mask 430 provided on the counter substrate 410b and the gate line 403 and the source line 405. Therefore, part of the black mask 430, which is positioned outside the region to which a sealing resin is applied corrodes due to electrochemical reaction with atmospheric moisture contained.

On the other hand, the black mask provided in the peripheral region outside the display region 450 should have a relatively large width. If the black mask does not have a sufficiently large width, the assembly accuracy needs to be increased, resulting in increased assembly cost. A width of the black mask should normally be about 2.5 mm in the peripheral region. As a result, the reduction of the peripheral region for reducing the weight and size of a liquid crystal display device is limited due to the corrosion described above.

SUMMARY OF THE INVENTION

The liquid crystal display device of the present invention includes: an active matrix substrate; a counter substrate; and a liquid crystal layer interposed between the active matrix substrate and the counter substrate, wherein the active matrix substrate includes a plurality of switching elements, a plurality of pixel electrodes, gate lines for supplying a control signal to the switching elements, and source lines for supplying a data signal to the switching elements, the gate lines and the source lines crossing each other, and the pixel electrodes being connected to the respective source lines through the switching elements, the counter substrate includes a counter electrode opposed to the plurality of pixel electrodes through the liquid crystal layer, the plurality of pixel electrodes, the counter electrodes and the liquid crystal layer interposed therebetween form a plurality of pixel regions, and wherein the liquid crystal display device includes a display region including the plurality of pixel regions and a peripheral region surrounding the display region, and the active matrix substrate includes a first conductive layer in the peripheral region.

In one embodiment of the invention, the counter substrate further includes a second conductive layer in a region opposed to the first conductive layer, and a voltage for conducting a black display is applied across the liquid crystal layer interposed between the first conductive layer and the second conductive layer.

In another embodiment of the invention, the first conductive layer is formed of the same material of the pixel electrodes.

In still another embodiment of the invention, the second electrode is formed in a single body including the counter electrode.

In still another embodiment of the invention, the counter substrate further includes a light shielding layer formed of a black resin material in a region corresponding to the second conductive layer.

In still another embodiment of the invention, the first conductive layer formed of a metal material having a light shielding function.

In still another embodiment of the invention, the active matrix substrate further includes an interlayer insulating film which covers the plurality of switching elements, the gate lines and the source lines, and the plurality of pixel electrodes are formed on the interlayer insulating film.

According to another aspect of the invention, a liquid crystal display device includes: an active matrix substrate; a counter substrate; and a liquid crystal layer interposed between the active matrix substrate and the counter substrate, wherein the active matrix substrate includes a plurality of switching elements, a plurality of pixel electrodes, gate lines for supplying a control signal to the switching elements, and source lines for supplying a data signal to the switching elements, the gate lines and the source lines crossing each other, and the pixel electrodes being connected to the respective source lines through the switching elements, the counter substrate includes a counter electrode opposed to the plurality of pixel electrodes through the liquid crystal layer, the plurality of pixel electrode, the counter electrodes and the liquid crystal layer interposed therebetween form a plurality of pixel regions, and wherein the liquid crystal display device includes a display region including the plurality of pixel regions and a peripheral region surrounding the display region, and the active matrix substrate includes a light shielding portion formed of a metal material in the peripheral region.

In one embodiment of the invention, the light shielding portion is formed of the same material as a material for at least one of the gate lines and the source lines.

In another embodiment of the invention, the light shielding portion includes a first light shielding portion formed separately from one of the gate lines or the source lines, and a second light shielding layer covering at least a part of a region between the first light shielding layer and the one of the gate lines or the source lines, and wherein the second light shielding portion is made of a different material from that for the first light shielding portion and the one of the gate lines or the source lines.

In still another embodiment of the invention, the second light shielding portion is made of the same material as the other one of the gate lines and the source lines.

In still another embodiment of the invention, the light shielding portion is formed separately from at least one of the gate lines or the source lines, and a pixel electrode in outermost region in the display region at least partially overlaps the light shielding portion.

In still another embodiment of the invention, an area surrounded by the gate lines and the source lines in the outermost pixel region in the display region is smaller than that of an area surrounded by the gate lines and the source lines in the pixel region in a remaining display region.

In still another embodiment of the invention, the light shielding portion is formed in a single body including the one of the gate lines or the source lines in an outermost region in the display region, and the outermost pixel region in the display region conducts a black display.

In still another embodiment of the invention, the counter substrate does not include a portion having a light shielding function.

In still another embodiment of the invention, the counter substrate further includes a color filter layer, a protection layer and an alignment film.

In still another embodiment of the invention, an overlapping area between the outermost pixel electrode and the gate lines in the display region differs from an overlapping area between any one of the other pixel electrodes and the gate lines in the display region.

In still another embodiment of the invention, a size of the switching element corresponding to the outermost pixel electrode in the display region differs from that of any one of the other switching elements.

In still another embodiment of the invention, the active matrix substrate and the counter substrate are attached to each other through a sealing resin, and the light shielding portion is provided so as to extend beyond a region on which the sealing resin is applied.

According to still another aspect of the invention, a liquid crystal display device includes: an active matrix substrate; a counter substrate; and a liquid crystal layer interposed between the active matrix substrate and the counter substrate, wherein the active matrix substrate includes a plurality of switching elements, a plurality of pixel electrodes, gate lines for supplying a control signal to the switching elements, source lines for supplying a data signal to the switching elements, the gate lines and the source lines crossing each other, and the pixel electrodes being connected to the respective source lines through the switching elements, the counter substrate includes a counter electrode opposed to the plurality of pixel electrodes through the liquid crystal layer, the plurality of pixel electrode, the counter electrodes and the liquid crystal layer interposed therebetween form a plurality of pixel regions, the liquid crystal display device includes a display region including the plurality of pixel regions and a peripheral region surrounding the display region, the counter substrate includes a color filter layer without a black matrix at least in an outermost region of the display region, and wherein the peripheral region of the active matrix substrate includes a first light shielding layer covering at least a region between the gate lines, and a second light shielding layer covering at least a region between the source lines.

In one embodiment of the invention, the first light shielding layer is provided so as to partially overlap the gate lines while the second line shielding layer is provided so as to partially overlap the source lines.

In another embodiment of the invention, the first light shielding layer and the second light shielding layer are provided so as to cover three or more of the adjacent gate lines or the adjacent source lines.

In still another embodiment of the invention, the first light shielding layer and the second light shielding layer are made of a conductive metal, wherein the first light shielding layer has a portion overlapping the gate lines via an insulating layer, and the first light shielding layer and the gate lines have the same potential, and wherein the second light shielding layer has a portion overlapping the source lines via an insulating layer, and the second light shielding layer and the source lines have the same potential.

In still another embodiment of the invention, a liquid crystal display device further includes: a plurality of liquid crystal capacitors formed by the plurality of pixel electrodes, the counter electrode and the liquid crystal layer interposed between the plurality of pixel electrodes and the counter electrode; and a plurality of storage capacitors connected to the respective liquid crystal capacitors in parallel, wherein a storage capacitor counter electrode forming each of the storage capacitors is provided so as to be parallel to the gate lines or the source lines while a storage capacitor common line is provided in the vicinity of a region opposed an outermost region of the color filter layer included in the counter substrate, and at least part of the first light shielding layer and the second light shielding layer is in contact with at least the storage capacitor common line.

In still another embodiment of the invention, a liquid crystal display device further includes: a plurality of liquid crystal capacitors formed by the plurality of pixel electrodes, the counter electrode and the liquid crystal layer interposed between the plurality of pixel electrodes and the counter electrode; and a plurality of storage capacitors connected to the respective liquid crystal capacitors in parallel, wherein a storage capacitor counter electrode forming each of the storage capacitors is provided so as to be parallel to the gate lines or the source lines while a storage capacitor common line is provided in the vicinity of a region opposed to an outermost region of the color filter layer included in the counter substrate, and the first light shielding layer and the second light shielding layer are provided independently of the storage capacitor common line.

In still another embodiment of the invention, a liquid crystal display device further includes a third light shielding layer in a region between one of the first light shielding layer or the second light shielding layer and the storage capacitor common line.

In still another embodiment of the invention, the first light shielding layer is formed simultaneously with formation of the source lines using the same material for the source lines while the second light shielding layer is formed simultaneously with formation of the gate lines using the same material as for the gate lines.

In a liquid crystal display device according to the present invention, an electrode is provided in the peripheral region surrounding the display region including the pixel electrodes provided on the active matrix substrate. As a result, light leakage from the region other than the display region can be eliminated. Simultaneously, the fabrication cost of the liquid crystal display device can be sufficiently reduced.

In the liquid crystal display device according to the present invention, a signal is applied to the electrode provided in the peripheral region of the display region including the pixel electrode so as to perform a black display. During the operation, the liquid crystal layer in the peripheral region of the display region performs a black display. As a result, it is possible to realize a liquid crystal display device with good display quality which does not need a black mask on the counter substrate and does not cause the light leakage from the peripheral region of the liquid crystal display panel.

By using the same material, the pixel electrode in the display region and the electrode in the peripheral region surrounding the display region can be simultaneously formed.

Furthermore, by providing a light shielding film made of a black resin in the peripheral region surrounding the display region on the counter substrate, light can be double-shielded by using both the black resin and the black display state of the liquid crystal layer. Therefore, a transmittance of the peripheral region (a frame region) surrounding the display region can be made sufficiently small; thus further improving the display quality of the liquid crystal display device.

By constituting the electrode provided in the peripheral region surrounding the display region including the pixel electrode by using a light shielding film consisting of a metal pattern, it is not necessary to form a black mask on the counter substrate. By covering the peripheral region (a frame region) surrounding the display region with a metal pattern, light leakage can be prevented and a transmittance can be made sufficiently small. Therefore, the display quality of the liquid crystal display device can be further improved.

Furthermore, in the liquid crystal display device of the present invention, an interlayer insulating film is provided between the pixel electrode, the source line and the gate line and a switching element. With this configuration, the surface of the active matrix substrate can be flattened, and the disorder of orientation of the liquid crystal molecules can be eliminated. As a result, a liquid crystal display device with higher display quality can be obtained. Moreover, owing to the interlayer insulating film, the line formed in the peripheral region surrounding the display region does not overlap a terminal electrode. Therefore, it is possible to form the electrode in the peripheral region surrounding the display region with ease.

According to the present invention, in the liquid crystal display device of the present invention, light leakage in the peripheral region surrounding the display region can be prevented only by a light shielding region formed on the active matrix substrate so that the actual display is not affected thereby. As a result, it is not necessary to form the light shielding region on the counter substrate. Therefore, the fabrication cost of the liquid crystal display device can be reduced.

The light shielding region provided on the active matrix substrate is protected from the atmospheric moisture by the layers interposing the light shielding region therebetween. Therefore, even when the light shielding region extends beyond the region on which the sealing resin is applied, the light shielding region does not corrode.

Furthermore, the light shielding regions provided above the gate line and in the region required to be shielded from light between the gate lines are made of the same material as that of the source line, while the light shielding regions provided above the source line and in the region required to be shielded from light between the source lines are made of the same material as that of the gate line. Therefore, the light shielding regions can be formed on the active matrix substrate without increasing the number of fabrication steps. Therefore, a liquid crystal display device having the reduced outer shape can be fabricated without increasing the fabrication cost.

According to the present invention, in the liquid crystal display device of the present invention, a light shielding layer provided on one of the substrates covers the outermost region of a color filter, which is not covered with a black mask. Moreover, the light shielding layer at least covers a region between the adjacent source lines or a region between the adjacent gate lines. Therefore, the light leakage from the region between the lines in the outermost peripheral region of a color filter can be prevented by the light shielding layer.

Moreover, the light shielding layer can be formed so as to partially overlap at least one of the source line and the gate line. Alternatively, the light shielding layer may be formed so as to cover three or more adjacent lines. If the light shielding layer partially overlaps the line while using the light shielding layer made of a conductive metal, the overlapping portion is reduced as compared with the case where the light shielding layer covers the entire line. Therefore, a capacity coupling between the light shielding layer and the line can be reduced. Moreover, in the case where the light shielding layer is formed so as to cover only a region between the lines and so as not to overlap the line, a capacity coupling can be further reduced however it is necessary to increase the patterning accuracy.

In the case where the light shielding layer is formed by using a conductive metal so as to cover the region between adjacent gate lines, the light shielding film can be formed by patterning simultaneously with the formation of the source line using the same material. In the case where the light shielding layer is formed so as to cover at least a region between adjacent source lines, the light shielding film can be formed by patterning simultaneously with the formation of the gate line using the same material. By such a process, since the separate step for forming the light shielding layer is not particularly needed, the fabrication process can be simplified. Moreover, the light shielding layer overlaps the line so as to interpose an insulating film therebetween, the same voltage may be applied thereto. In the case where the same voltage is applied, a contact hole is formed through part of the insulating film where the light shielding layer and the line overlap each other so that the light shielding layer and the line are connected to each other. Alternatively, the light shielding layer and the line can be directly connected to each other through a lead line. If the same voltage is applied to the light shielding layer and the line, a capacity coupling therebetween can be extremely small.

In the vicinity of the thus provided light shielding layer, a conductive member different from the source line and the gate line, for example, a storage capacitor ($C_S$) main line, may be provided. The $C_S$ main line is provided in the vicinity of the light shielding layer so as to reduce the area of the peripheral region. The light shielding layer made of a conductive metal and the $C_S$ main line can be conductive to each other or can be insulated from each other, depending on the purpose. The $C_S$ main line is provided so as to connect a plurality of storage capacitor ($C_S$) lines to each other which are formed so as to be parallel to the source lines or the gate lines.

In the case where the same voltage as that applied to a counter electrode is applied to the light shielding layer, the light shielding layer may be provided so as to be in contact with the $C_S$ main line or to overlap the $C_S$ main line. In the case where the same voltage as that applied to a counter electrode is not applied to the light shielding layer, it is necessary to provide a light shielding layer to be separated from the $C_S$ main line. Therefore, light leaks from a gap therebetween. However, if another light shielding layer is provided in the gap, the amount of light leakage can be reduced.

Thus, the invention described herein makes possible the advantage of providing a liquid crystal display device having a light shielding film with high reliability, which is capable of preventing light leakage from the peripheral region without providing a black mask in the peripheral region surrounding a display region on a counter substrate and is thus capable of reducing the outer size thereof.

This and other advantages of the present invention will become apparent to those skilled in the art upon reading and understanding the following detailed description with reference to the accompanying figures.

BRIEF DESCRIPTION OF THE DRAWINGS

FIG. 4 is a plan view showing the basic configuration of a peripheral region surrounding a display region of an active matrix substrate in a liquid crystal display device of Examples 4 to 7 according to the present invention.

FIG. 5 is a cross-sectional view showing the active matrix substrate according to the present invention.

FIG. 16A shows the case where a black mask is provided inside the region to which a sealing resin is applied; and FIG. 16B shows the case where a black mask is provided so as to extend beyond the region to which a sealing resin is applied.

DESCRIPTION OF THE PREFERRED EMBODIMENTS

Hereinafter, the present invention will be described by way of illustrative examples.

EXAMPLE 1

Figure 1:
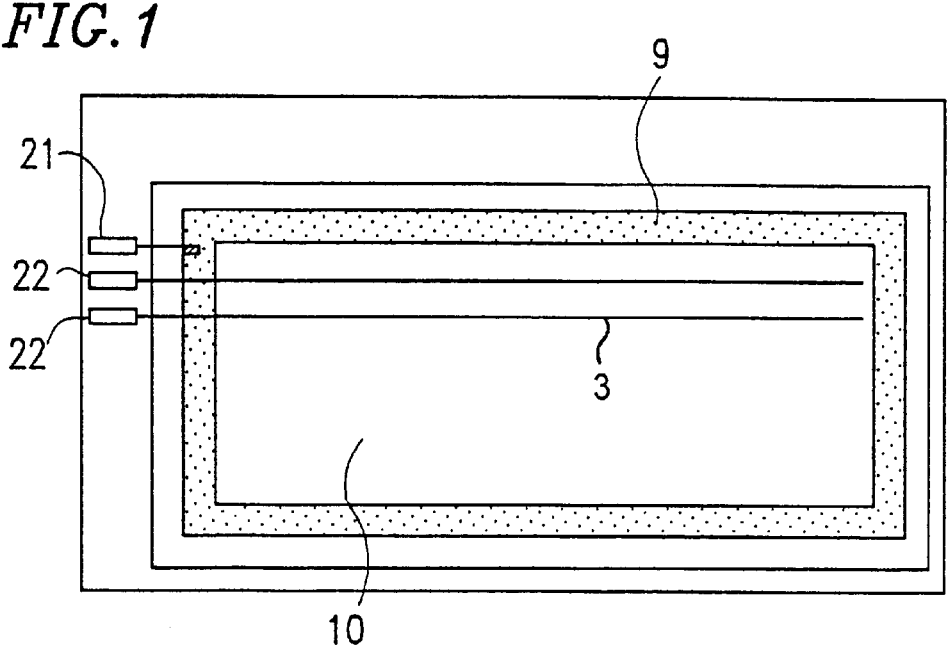
FIG. 1 is a plan view showing a liquid crystal display device of Example 1 according to the present invention.
Figure 2:
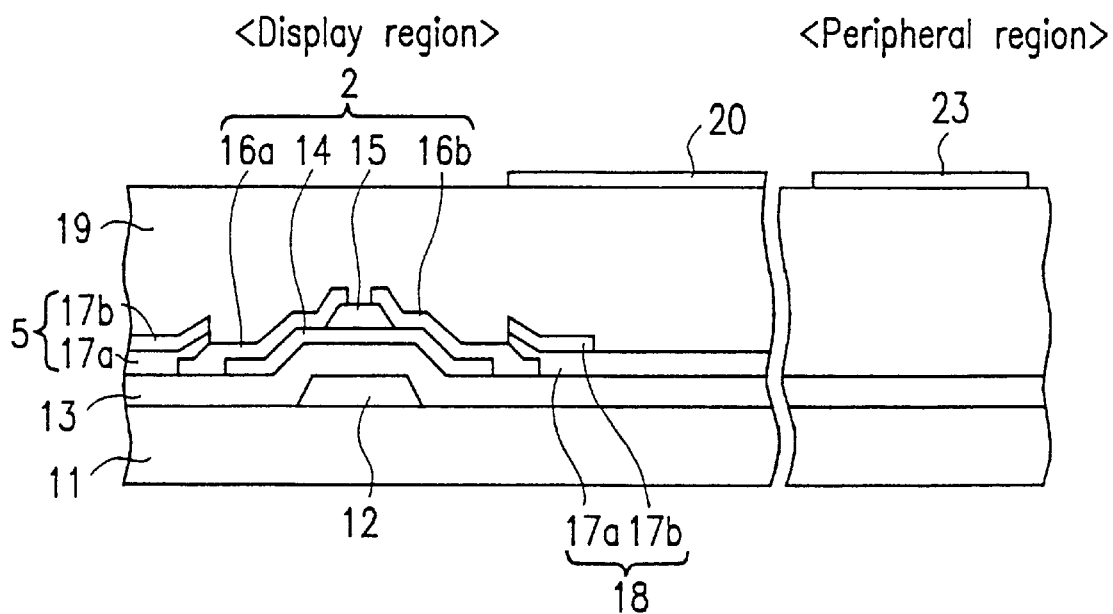
FIG. 2 is a cross-sectional view showing the configuration of an active matrix substrate included in the liquid crystal display device of Example 1 according to the present invention.

FIG. 1 is a plan view showing the structure of an active matrix substrate in a liquid crystal display device of Example 1 according to the present invention, and FIG. 2 is a cross-sectional view showing the configuration thereof. In Examples 1 to 3, the components having the same functions are denoted by the same reference numerals.

As shown in FIG. 2, a gate electrode 12 made of a metal such as Al, Ta and Cr connected to a gate line is formed on a transparent insulating substrate 11 made of glass or the like. A gate insulating film 13 made of SiNx, SiO$_2$ or the like is formed covering the gate electrode 12. A semiconductor layer 14 made of Si, or the like, is formed on the gate insulating film 13 so as to overlap the gate electrode 12 via the gate insulating film 13, and a channel protection layer 15 made of SiNx, or the like, is formed on the center of the semiconductor layer 14. n$^+$-Si layers as a source electrode 16a and a drain electrode 16b are formed covering the end portions of the channel protection layer 15 and portions of the semiconductor layer 14, so that they are separated from each other at the top of the channel protection layer 15.

A metal layer 17b and a transparent conductive layer 17a which are to be a source line 5 shown in FIG. 2 are formed to overlap the source electrode 16a as one of the n$^+$-Si layers. Another metal layer 17b and another transparent conductive layer 17a which are to be a connecting electrode 18 are formed to overlap the drain electrode 16b as the other n$^+$-Si layer so as to connect the drain electrode 16b and the pixel electrode 20. An interlayer insulating film 19 is formed covering the TFT 2, the gate line 3 (shown in FIG. 1), and the source line 5.

Over the entire surface of the active matrix substrate, a photosensitive acrylic resin film having a thickness of, for example, about 3 μm is provided as an interlayer insulating film 19 by a spin coating method so as to cover the upper part of the thus formed TFT. A pixel electrode 20 made of ITO is patterned on the interlayer insulating film 19 by sputtering. In the present invention, simultaneously with the formation of the pixel electrode 20 within a display region 10 as shown in FIG. 1, an electrode 23 made of ITO is also formed in a peripheral region (frame region) 9 of the display region 10 so as to surround the display region 10.

Alignment films are formed on the pixel electrode 20 and a counter electrode formed on a counter substrate (not shown), respectively. Then, the thus manufactured active matrix substrate and the counter substrate are attached to each other. Thereafter, a liquid crystal material is sealed within a gap between the active matrix substrate and the counter substrate, thereby completing a liquid crystal display device of Example 1.

As shown in FIG. 1, a terminal 22 applies a signal for driving a normal switching element to the pixel electrode 20 formed within the display region 10 on the active matrix substrate 11. To the electrode 23 formed in the peripheral region 9 so as to surround the display region, a terminal 21 provided independent of the terminals 22 for driving the normal switching element applies a signal across a LC layer to conduct a black display.

Like a conventional liquid crystal display device, a counter electrode is formed over at least the entire surface of the display region and the peripheral part of the display region on the counter substrate. Therefore, when the liquid crystal display device operates so as to perform a display, an electric field is also applied to a liquid crystal material in the peripheral region surrounding the display region so as to conduct a black display. As a result, the peripheral region surrounding the display region including the pixel electrode 20 is shielded from light.

Light shielding in the boundary region between pixel electrodes in the display region is effected by a gate line and a source line made of a light shielding material. The gate line and the source line pass across the peripheral region of the pixel electrodes formed in a matrix so as to cross each other.

With such a configuration, a liquid crystal display device with high display quality having a counter substrate which does not require a black mask and is free from light leakage from the peripheral region of the liquid crystal display panel can be realized.

EXAMPLE 2

The configuration of a liquid crystal display device of Example 2 is the same as that of Example 1 except that a black mask made of a black resin is formed on a counter electrode formed in the peripheral region surrounding the display region on the counter substrate.

In the case where a black resin is used as a material of the black mask in a conventional liquid crystal display device, a transmittance is relatively high as compared with the case where a black mask is formed by using a metal. Therefore, a peripheral region (a frame region) surrounding the display region cannot be completely shielded from light. On the other hand, since a double light shielding is attained by using both the black resin and the black display state of the liquid crystal material in Example 2, a transmittance in the peripheral region (a frame region) of the display region can be sufficiently small. Therefore, the display quality of the liquid crystal display device can be further improved.

EXAMPLE 3

Figure 3:
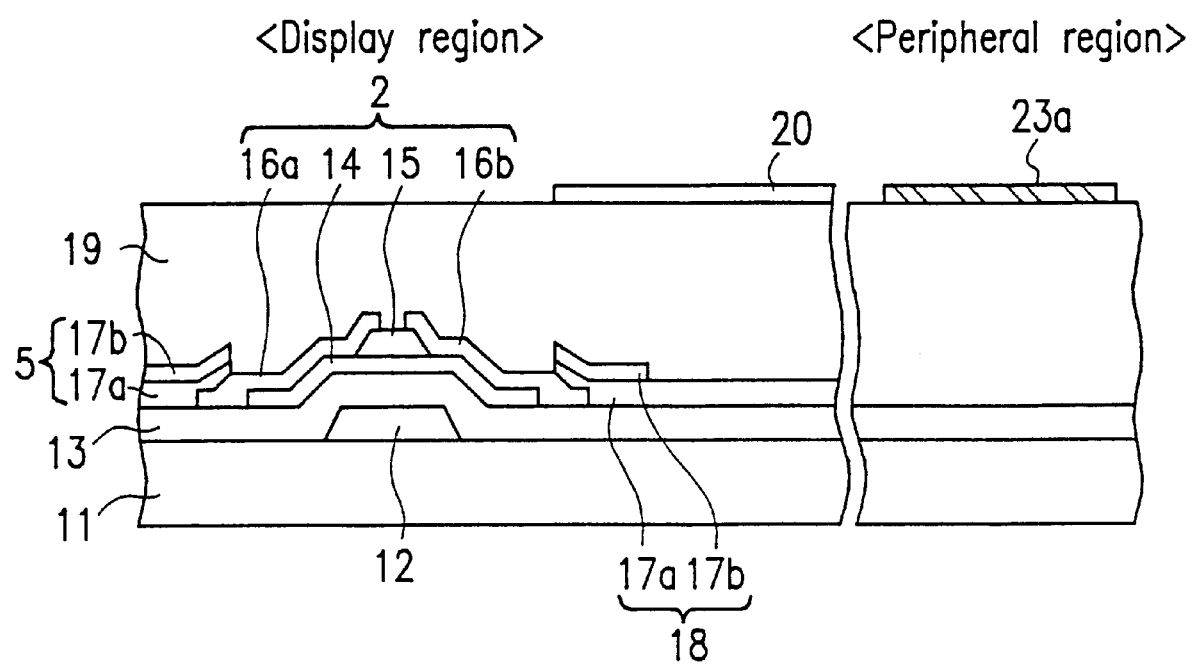
FIG. 3 is a cross-sectional view showing the configuration of an active matrix substrate included in a liquid crystal display device of Example 3 according to the present invention.

FIG. 3 is a cross-sectional view showing the configuration of an active matrix substrate in a liquid crystal display device of Example 3 according to the present invention.

As shown in FIG. 3, in the liquid crystal display device of Example 3, the pixel electrode 20 made of ITO is formed on the display region on the interlayer insulating film 19 formed over the active matrix substrate, while an electrode 23a having a metal pattern made of Al, Cr, Ta, Ti or the like is formed in the peripheral region so as to surround the display region. The other configuration of the liquid crystal display device of Example 3 is the same as that of Example 1. In this configuration, it is not necessary to apply an electric potential to the electrode 23a.

In the thus configured liquid crystal display device of Example 3, the peripheral region (frame region) of the display region is shielded from light by a metal pattern so as to prevent the light leakage therefrom. Therefore, a transmittance can be made sufficiently small, thereby improving the display quality of the liquid crystal display device.

Like the previous examples, it is not necessary to form a black mask on a counter substrate in Example 3.

In the liquid crystal display device of Examples 1 to 3 according to the present invention, an electrode for applying a signal across a LC layer to conduct a black display is provided in a peripheral region (frame region) of the display region including the pixel electrode on the active matrix substrate. Since a black display is conducted in the peripheral region surrounding the display region, a light-shielding pattern (black mask) is not required to be formed on the counter substrate. As a result, a liquid crystal display device with high display quality, in which light leaking from the peripheral region surrounding the display region is not conspicuous, is realized.

EXAMPLE 4

Next, the configuration of an active matrix substrate of Example 4 according to the present invention will be described. In Examples 4 to 7 described below, the components having the same functions are denoted by the same reference numerals.

In Example 4, a light shielding pattern is provided in a peripheral region of a display region 150 on an active matrix substrate 151. FIG. 4 shows a light shielding pattern on the active matrix substrate of Example 4. Light shielding regions 121 are respectively provided in the regions adjacent to the right side and the left side of the display region 150, while light shielding regions 122 are respectively provided in the regions adjacent to the upper side and the lower side of the display region 150. As described below in detail, the light shielding regions 121 are made of the same material as that of a source line 105, while the light shielding regions 122 are made of the same material as that of a gate line 103. Not only input terminals 103a and 105a, the gate line 103, the source line 105 and the light shielding regions 121 and 122, but also pixel electrodes arranged in a matrix and TFTs connected to the respective pixel electrodes are actually formed on the active matrix substrate. However, these components are omitted in FIG. 4 for simplicity.

FIG. 5 is a cross-sectional view showing the vicinity of a TFT 102 of the active matrix substrate 151. A gate electrode 112 connected to the gate line 103 is formed on a transparent insulating substrate 111. A common line 104 (shown in FIG. 6) functioning as a storage capacitor counter electrode is also provided on the transparent insulating substrate 111. Although a metal such as Ta, Mo or Al can be generally used as a material of the gate line 103 and the storage capacitor counter electrode 104, Ta is used in Example 4. A gate insulating film 113 is formed covering the gate line 103 and the storage capacitor counter electrode 104. A semiconductor layer 114 is formed on the gate insulating film 113 so as to overlap the gate electrode 112 via the gate insulating film 113, and is patterned into a predetermined shape. A channel protection layer 115 is formed on the center of the semiconductor layer 114. n$^+$-Si layers as a source electrode 116a and a drain electrode 116b are formed covering the end portions of the channel protection layer 115 and portions of the semiconductor layer 114, so that they are separated from each other by a portion of the channel protection layer 115.

A transparent conductive film 117a such as ITO and a metal layer 117b, which are to be the double-layer source line 105, are formed in this order to overlap the source electrode 116a as one of the n$^+$-Si layers. Another transparent conductive film 117a and another metal layer 117b are formed to overlap the drain electrode 116b as a connecting electrode 118. Although Ta, Mo, Al or the like can be generally used as a material of the metal layers 117b, Ta is used in Example 4. The transparent conductive film 117a extends to connect the drain electrode 116b and the pixel electrode 120 and also serves as the connecting electrode 118 which is connected to a storage capacitor electrode 101 (shown in FIG. 6) of the storage capacitor. By providing a double-layered structure for the source line 105 in this manner, even if part of the metal layer 117b is defective, the source line 105 can remain electrically conductive through the transparent conductive film 117a. Thus, this configuration is advantageous in that the occurrence of disconnection of the source line 105 can be reduced. Furthermore, the drain electrode 116b is connected to a storage capacitor electrode 101 shown in FIG. 6 via the connecting electrode 118. The drain electrode 116b is connected to the pixel electrode 120 described below through the connection line 118. The connecting electrode 118 is made of the transparent conductive film 117a used as an underlying layer of the source line 105. Only part of the connection line 118 connected to the drain electrode 116b has a double-layered structure including the metal layer 117b and the transparent conductive film 117a as the source line 105. The manufacturing process described above is known in the conventional process.

A photosensitive acrylic resin is applied to the resultant substrate to a thickness of 3 μm, for example, by spin coating to form an interlayer insulating film 119 so as to cover a TFT 102, the gate line 103, the source line 105, and the connecting electrode 118. Then, a contact hole 119a (shown in FIG. 6) is formed through the interlayer insulating film 119. The use of a photosensitive acrylic resin is advantageous in that the contact hole 119a can be formed simultaneously with the formation of the interlayer insulating film 119.

A transparent conductive film is formed by sputtering on the interlayer insulating film 119, and is patterned into a predetermined shape so as to constitute the pixel electrode 120. The pixel electrode 120 is connected to the drain electrode 116b of the TFT 102 via the contact hole 119a formed through the interlayer insulating film 119 and the transparent conductive film 117a which is part of the connecting electrode 118. Alternatively, a film made of a light shielding material can be formed by sputtering and patterned so as to surround the display region 150. In this case, the light shielding regions 121 and 122 as described above are not required. If the light shielding film is provided on the active matrix substrate as described above, the need for a margin, which is conventionally required due to poor attachment accuracy between the active matrix substrate and the counter substrate, can be eliminated.

Owing to such a configuration, within the display region 150, the pixel electrode 119 for applying an electric field across the liquid crystal layer is allowed to overlap the gate line 103 and the source line 105, each including the upper layer made of a metal or each being entirely made of a metal. A region of the liquid crystal layer, across which a signal voltage is not applied, is shielded from light by the gate line 103 and the source line 105. As a result, the need of providing a black mask in the display region is eliminated.

Returning to FIG. 4, the light shielding regions 121 and 122 in the periphery of the display region 150 will be described. Each of the light shielding regions 121 and 122 is constituted by using a metal film formed on the active matrix substrate. The light shielding regions 121 provided in the regions adjacent to the left side and the right side of the display region 150 (i.e., bridged by the gate lines 103) are constituted by using the same metal layer as that used for forming the source line 105, i.e., the upper layer 117b of the double-layered structure. More specifically, the light shielding regions 121 are formed simultaneously with the formation of the upper metal layer 117b of the source line 105 by patterning the metal layer 117b formed on the transparent conductive film 117a by sputtering. Since the metal layer 117b in Example 4 is made of Ta as described above, the light shielding regions 121 are also made of Ta.

The light shielding regions 122 provided in the regions adjacent to the upper side and the lower side of the display region 150 (i.e., bridged by the source lines 105) are made of the same metal material as that of the gate line 103. The light shielding regions 122 are formed simultaneously with the formation of the gate line 103 by patterning the metal layer used for forming the gate line 103. Since the gate line 103 is made of Ta as described above, the light shielding regions 122 are also made of Ta.

As described above, by providing the light shielding regions for preventing light leakage from the peripheral region of the display region 150 on the active matrix substrate 151 instead of the counter substrate, the fabrication cost of a liquid crystal display device can be reduced. In particular, by forming the light shielding regions on the active matrix substrate 151 using the same material as that of the gate line or the source line, the fabrication cost of the counter substrate can be reduced without increasing the fabrication cost of the active matrix substrate. Thus, this fabrication method is far more effective in reduction of the fabrication cost of the display device.

Figure 6:
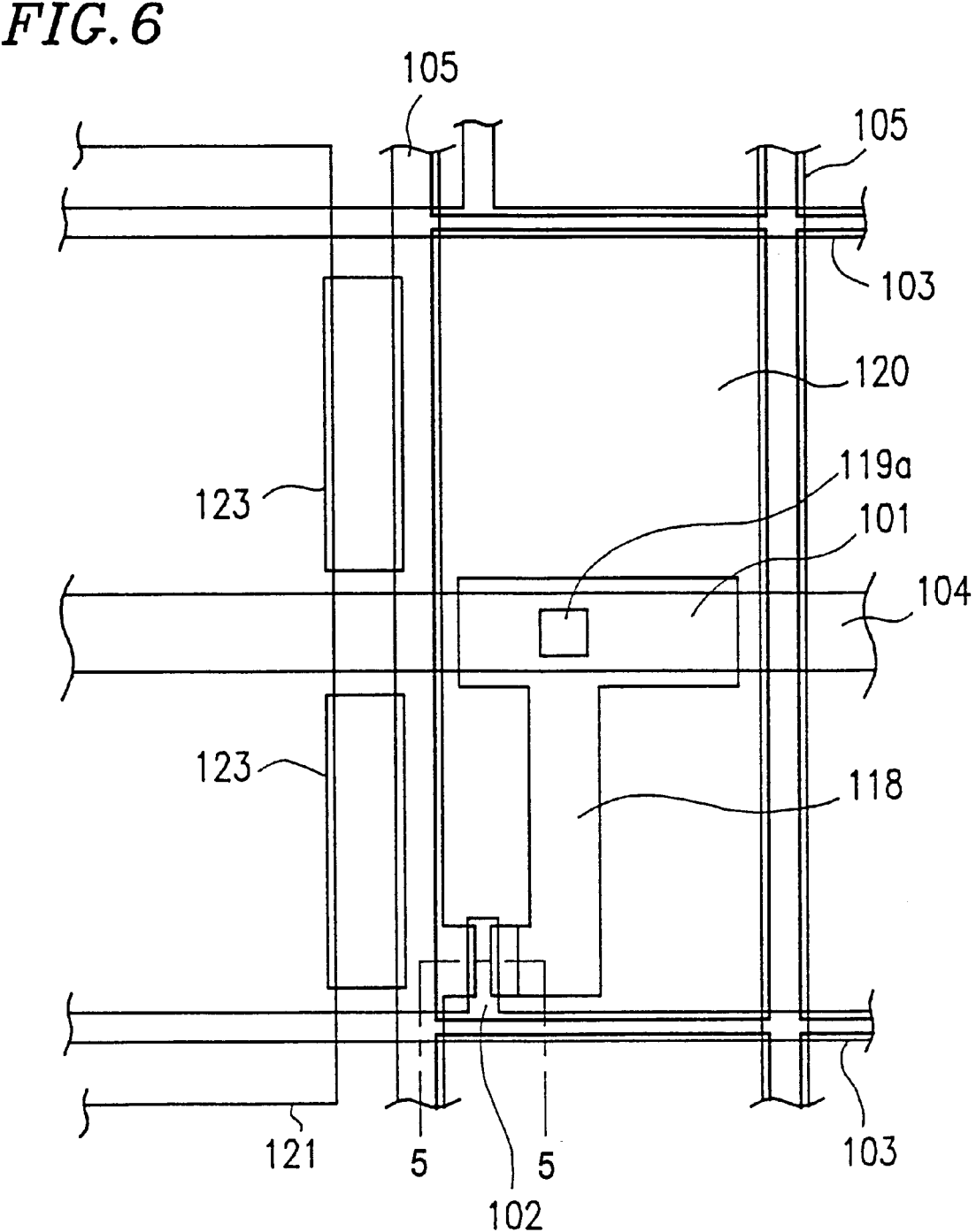
FIG. 6 is a plan view showing the configuration of the boundary region between a display region and a peripheral region in a liquid crystal display device of Example 4 according to the present invention.

FIG. 6 is a plan view showing the detail of the display region 150 and the boundary region between the display region 150 and the periphery thereof. In FIG. 6, the left boundary region of the display region 150 in FIG. 4 is representatively shown. FIG. 5 mentioned above is a cross-sectional view of the TFT 102 taken along a line 5-5' in FIG. 6.

The light shielding region 121 is formed by using the same metal layer as that included in the source line 105. Since the source line 105 has a double-layered structure including the metal layer 117b and the transparent conductive film 117a, the light shielding region 121 is made of the same material (in this case, Ta) as that of the metal layer 117b. At this time, the light shielding region 121 is formed so as to be separated from the source line 105 for applying a data signal (e.g., a video signal) to the outermost row of the pixel electrodes 120 arranged in a matrix. If the light shielding region 121 is formed in a single body including the source line 105 connected to the outermost row of the pixel electrodes 120, the light leakage from a region between the light shielding region 121 and the source line 105 can be prevented. However, a resistance and a parasitic capacitance of the source line 105 disadvantageously differ from those of the other source lines. As a result, even when the same data signal (e.g., video signal) is applied to the source lines, the voltages applied to the pixel electrodes may differ from each other. Particularly in the case where the gray level display is performed, the difference in the display level will be conspicuous. Therefore, although light leaks from a region between the light shielding region 121 and the source line 105 connected to the outermost row of the pixel electrodes 120 in Example 4, light shielding portions 123 are formed so as to prevent light from leaking from this region.

The light shielding portions 123 are formed by patterning the same metal layers included in the gate line 103 and the storage capacitor counter electrode 104 simultaneously with the formation of the gate line 103 and the storage counter electrode 104. Therefore, the light shielding portions 123 are required to be separated from the gate line 103 and the storage capacitor counter electrode 104. Hence, it is unavoidable that a light leaking portion still remains in the periphery of the intersection of the gate line 103, the storage capacitor line 104 and the source line 105. In the liquid crystal display device of Example 4, however, the light leaking region is reduced to a minimum so that the light leakage does not affect the actual display.

By constituting the active matrix substrate as described above, the amount of light leaking from the peripheral region can be reduced to such an extent that the display is not affected thereby even without providing the light shielding region in the vicinity of the display region 150 on the counter substrate.

In Example 4, the configuration of the boundary region of the active matrix substrate between the display region and the periphery thereof has been described, particularly by showing the left boundary part of the active matrix substrate. The same configuration can be adopted to the upper boundary region of the active matrix substrate. More specifically, the light shielding region 122 is formed by using the metal layer common to the gate line 103 in the upper boundary region of the display region. For the same reason as that described for the light shielding regions 121, however, the light shielding region 122 should be formed so as to be separated from the gate line 103 for driving the uppermost column of the pixel electrodes 120. Accordingly, above a gap between the light shielding region 122 and the uppermost column of the gate line 103, a light shielding portion corresponding to the aforementioned light shielding portion 123 is formed by using the same material as that of the source line 105 so as to partially overlap the light shielding region 122 and the uppermost column of the gate line 103. Although a light leaking portion still remains in the vicinity of the intersection of the gate line 103 and the source line 105, light leakage from this region does not affect the display because the light leakage portion is designed in such a way as to minimize light leakage.

The right boundary region and the lower boundary region of the display region 150 can be configured in the same manner as the left boundary region and the upper boundary region of the display region 150. Specifically, in the right boundary region of the display region 150, the light shielding region 121 is formed so as to be separated from the rightmost line such as the common line. The light shielding region 123 similar to that in the left boundary region is formed so as to prevent light from leaking from a gap between the line and the light shielding region 121. The same can be applied to the lower boundary region.

EXAMPLE 5

Next, a liquid crystal display device of Example 5 according to the present invention will be described.

Figure 7:
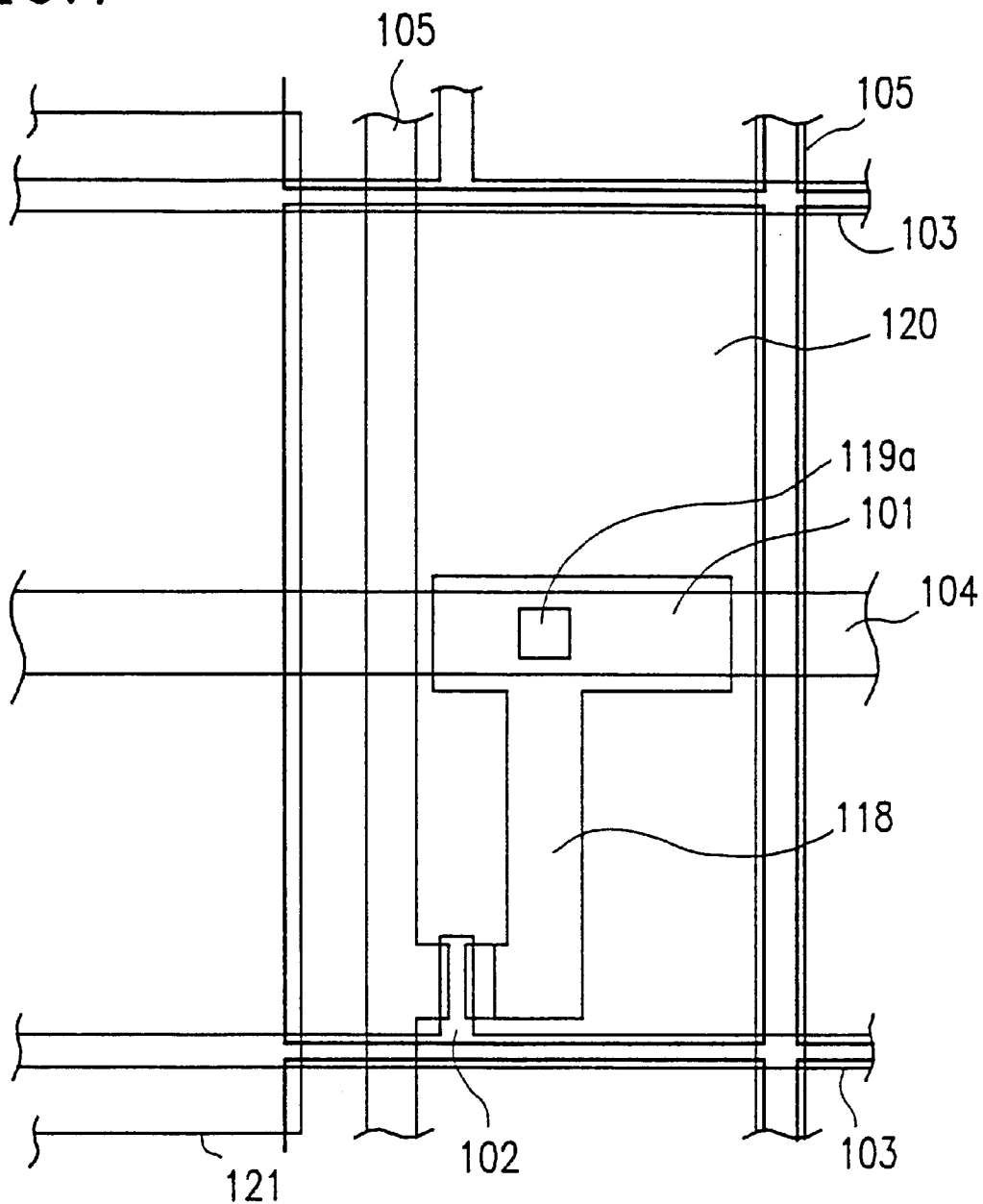
FIG. 7 is a plan view showing the configuration of the boundary region between a display region and a peripheral region in a liquid crystal display device of Example 5 according to the present invention.

FIG. 7 is a plan view showing the boundary region between the display region 150 and the peripheral region thereof in the active matrix substrate in Example 5 in detail. Like FIG. 6, FIG. 7 representatively shows the left boundary region of the display region 150. In Example 5, the components having the same functions as those in Example 4 are denoted by the same reference numerals.

The configuration of the active matrix substrate 151 of Example 5 is the same as in Example 4 in that the light shielding region 121 is formed by using the metal layer common to the source line 105 so as to be separated from the source line 105 for driving the outermost row of the pixel electrodes 120. However, the configuration of the active matrix substrate 151 differs from Example 4 in that the outermost row of the pixel electrodes 120 is formed so as to overlap the light shielding portion 121. Since a light leaking region between the light shielding region 121 and the outermost source line 105 overlaps the outermost pixel during display, the light leakage is not actually perceived.

Although only the left boundary region between the display region and the periphery thereof is described in detail in Example 5, the upper boundary region between the display region and the periphery thereof can have the same configuration. More specifically, in the upper boundary region, the light shielding region 122 is made of the same material as that of the gate line 103. The light shielding region 122 is formed so as be separated from the gate line 103 connected to the uppermost row of the pixel electrodes 120. By forming the light shielding region 123 above a gap between the gate line 103 and the light shielding region 122 so as to partially overlap the uppermost column of the pixel electrodes 120, the light leakage from the gap can be rendered imperceivable.

Example 5 describes the configuration in which the light shielding region 121 is formed separately from the outermost source line 105 so as to partially overlap the pixel electrode 120, and the configuration in which the light shielding region 122 is formed separately from the outermost gate line 103 so as to partially overlap the pixel electrode 120. However, it is not necessary that the light shielding region 121 or 122 overlaps the pixel electrode 120. Even if the configuration, in which the pixel electrode 120 overlaps part of the gap between the light shielding portion 121 and the source line 105 or between the light shielding portion 122 and the gate line 103, is adopted, the same effect as that of Example 5 can be attained, that is, the light leakage from the gap is rendered imperceivable.

The light leakage can be rendered imperceivable in the right boundary region or the lower boundary region of the display region by forming the rightmost pixel electrode 120 so as to overlap the light shielding portion 121 or by forming the lowermost pixel electrode 120 so as to overlap the light shielding portion 122. Furthermore, it is not necessary that the pixel electrode 120 overlaps the light shielding region 121 or 122. The light leakage can be rendered imperceivable as long as the pixel electrode 120 overlaps a gap between the rightmost source line 105 and the light shielding region 121 or a gap between the lowermost gate line 103 and the light shielding region 122.

Figure 8:
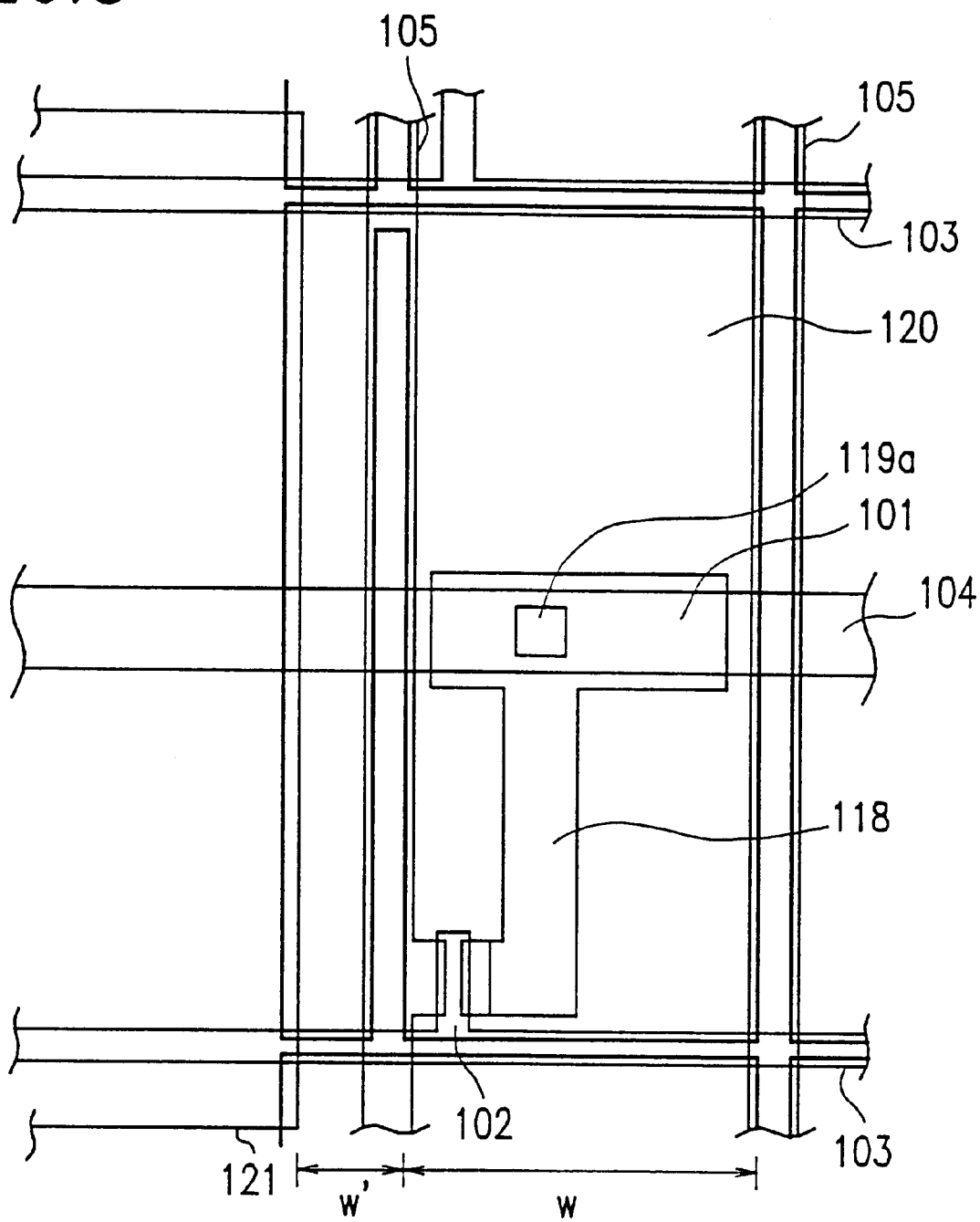
FIG. 8 is a plan view showing a modification of the liquid crystal display device of Example 5.

In Example 5, the outermost pixel electrode 120 can be shaped so that the region positioned above the line such as the source line 105 is omitted, for example, as shown in FIG. 8. In this case, it is possible to reduce a capacity coupling between the pixel electrode 120 and the line. As a result, a difference of display between the outermost pixel electrode and the other electrodes can be reduced.

If the outermost pixel electrode 120 is configured so as to have the shape as shown in FIG. 8, however, the following problem arises. The width of the outermost pixel electrode 120 is the sum of a normal pitch w of the pixel electrode and a width w' of a slit between the source line 105 and the light shielding region 121. Since the outermost pixel electrode 120 is larger than the other pixel electrodes, the capacitance thereof is also accordingly large. Hence, only the outermost pixel electrode 120 is likely to be insufficiently charged depending on a driving condition or a production process. As a result, only the outermost pixel is perceived as a bright line during a gray level display.

In order to increase an alignment margin during production so as to solve the above problem, only the layout of the outermost pixel electrode is changed so that a width w+w' of the outermost pixel electrode is adjusted to a width w of the other pixel electrodes. In this case, the alignment during production which should be provided for solving the aforementioned problem can be increased because a difference in capacitance between the outermost pixel electrode and the other pixel electrode can be reduced. This concept is similarly applicable to the uppermost or lowermost pixel electrode within the display region. In such a case, if the region corresponding to the pixel electrode itself is reduced by a width corresponding to a vertically extending slit only for the uppermost or lowermost pixel electrode, the symmetry of the uppermost or lowermost pixel electrode to the other pixel electrode can be increased so as to increase the alignment margin during production.

Figure 8A:
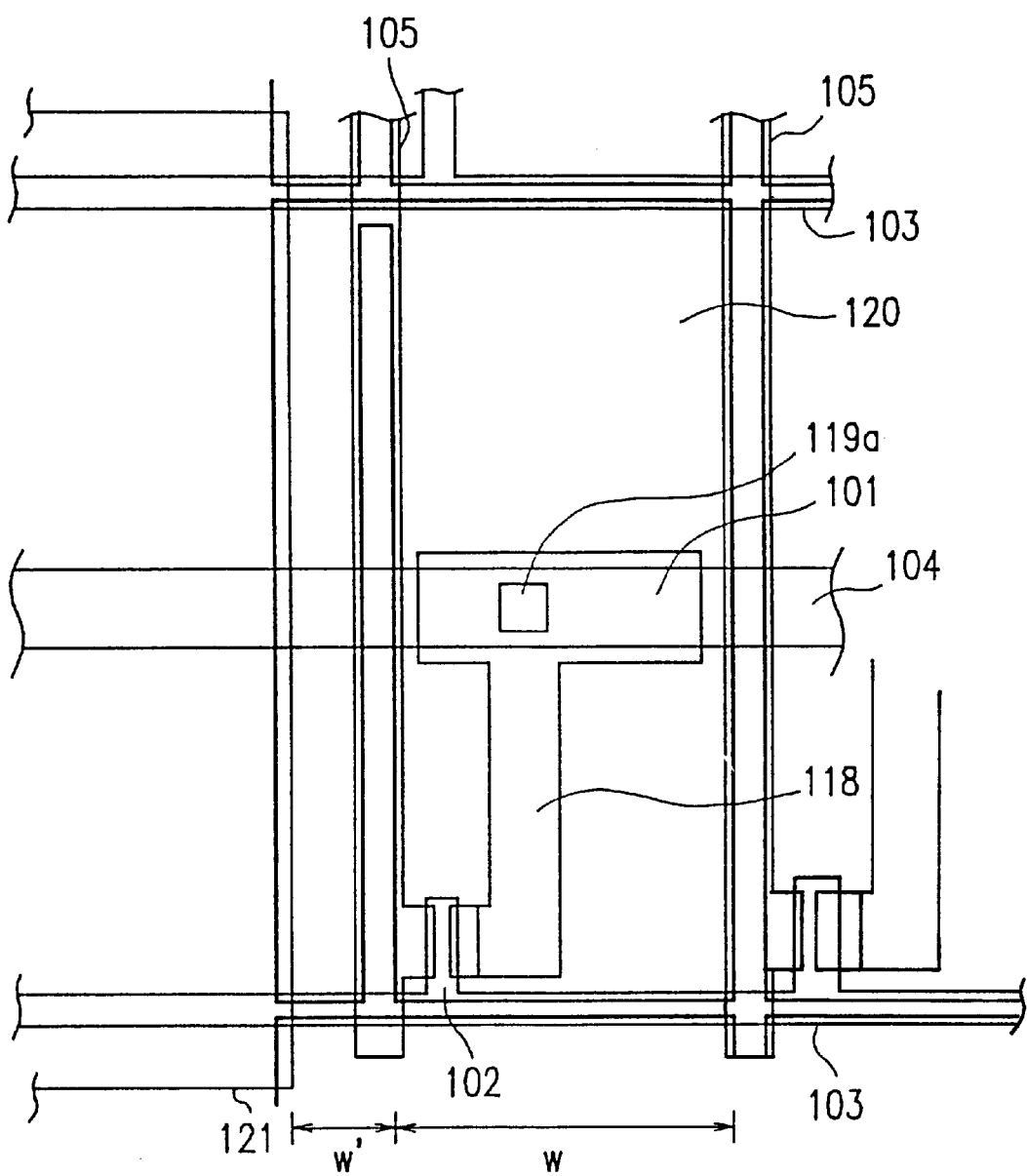
FIG. 8A is a plan view showing a difference in size of the TFT for the outermost pixel.

Furthermore, the feedthrough amount of a voltage of the pixel electrodes at the time of switching of the TFT differs due to a subtle difference in capacitance between the gate line connected to the outermost pixel electrode and the other gate lines connected to the other pixel electrodes. A DC component is applied across the outermost pixel alone, may result in a problem of reliability. However, this difference can be adjusted by changing the size of the TFT only for the outermost pixel electrode as shown in FIG. 8A or changing the overlapping area between the pixel electrode provided on a resin film and the gate line.

EXAMPLE 6

Next, a liquid crystal display device of Example 6 according to the present invention will be described.

Figure 9:
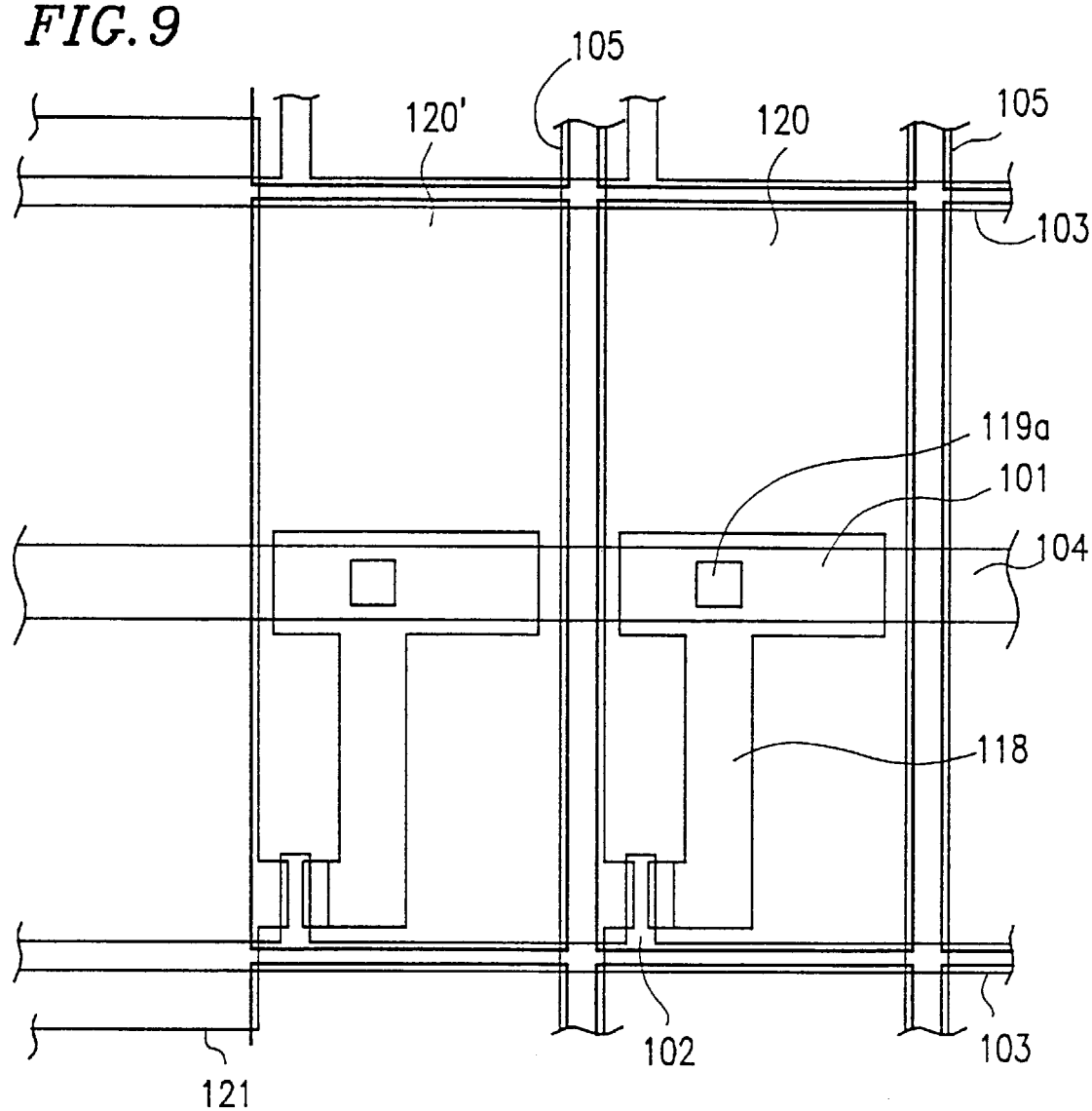
FIG. 9 is a plan view showing the configuration of the boundary region between a display region and a peripheral region in a liquid crystal display device of Example 6 according to the present invention.

FIG. 9 is a plan view showing the boundary region between a display region and a peripheral region thereof in detail in Example 6. Like FIGS. 6 and 7, only the left boundary region of the display region is representatively shown in FIG. 9. In Example 6, the components having the same functions as those of Example 4 are denoted by the same reference numerals. The configuration of Example 6 is the same as those of Examples 4 and 5 in that the light shielding region 121 is formed by using the same material as that of the source line 105. However, the configuration of Example 6 differs from those of Examples 4 and 5 in that the light shielding region 121 is integrally formed with the source line 105 for driving an outermost pixel electrode 120'. In this configuration, a larger number of pixel electrodes than required are formed, and a signal always allowing a black display is applied to the outermost pixel electrode 120'. As a result, asymmetry of the outermost pixel electrode does not affect the display. Moreover, the amount of light leakage from a gap between the peripheral light shielding region and the display region can be reduced to such a level that no problem arises therefrom.

Although only the left boundary region of the display region is described, the same configuration is also applicable to the upper boundary region of the display region. More specifically, the gate line 103 for driving the uppermost pixel electrode 120' and the light shielding region 122 are integrally formed. Then, a signal always allowing a black display is applied to the uppermost pixel electrode 120'. As a result, also in the upper boundary region of the display region, the same effect as that described in the previous examples can be obtained. Also for the rightmost or lowermost boundary region of the display region, if the rightmost or lowermost line, for example, the common line is integrally formed with the light shielding region 121 or 122, the light leakage from the right or lower part of the display region can be also prevented.

As shown in FIG. 9, the TFT 102 is connected to the leftmost (or uppermost) pixel electrode 120' always performing a black display. A display signal is written to the pixel electrode 120' via the TFT 102. However, the configuration of the present invention is not limited to this. For example, the same effect can be obtained even in the case where the source line is directly connected to the pixel electrode 120'.

EXAMPLE 7

Next, a liquid crystal display device of Example 7 according to the present invention will be described.

Figure 10A:
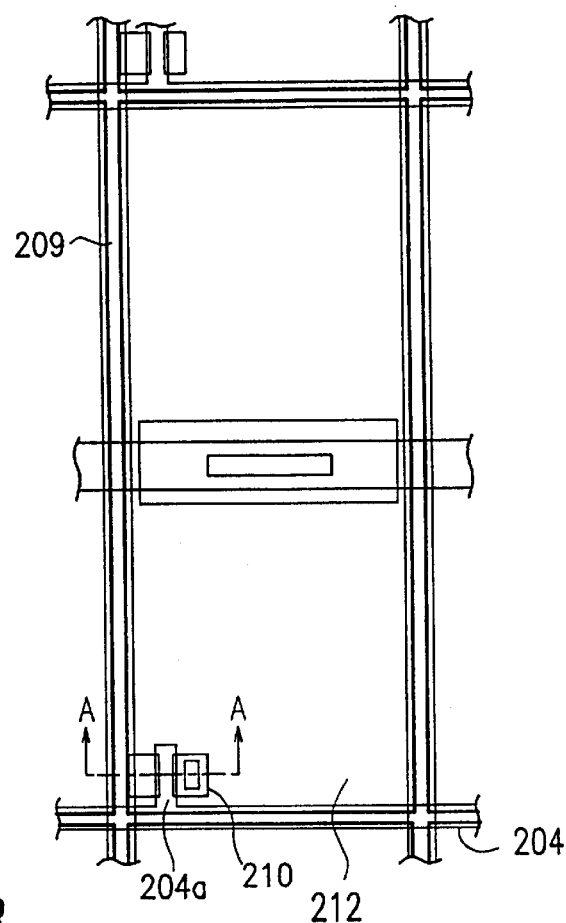
FIG. 10A is a plan view showing the configuration of one pixel electrode in a display region of a liquid crystal display device of Example 7 according to the present invention.
Figure 10B:
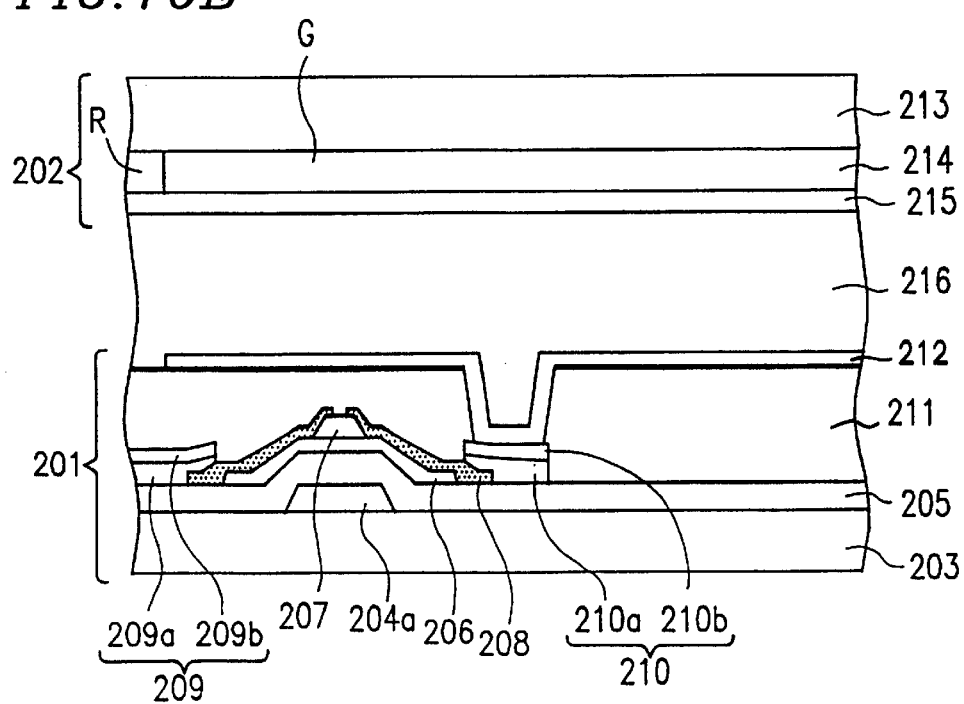
FIG. 10B is a cross-sectional view thereof, taken along a line 10B—10B in FIG. 10A.
Figure 11:
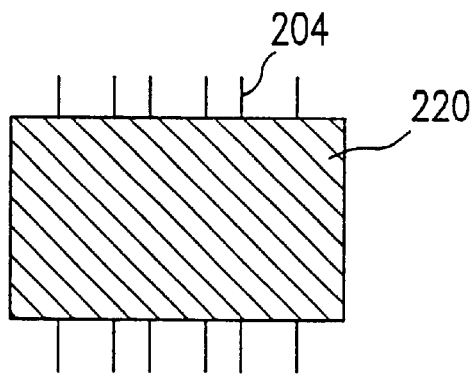
FIG. 11 is a plan view showing the configuration of the peripheral region of a liquid crystal display device of Example 7 according to the present invention.
Figure 13:
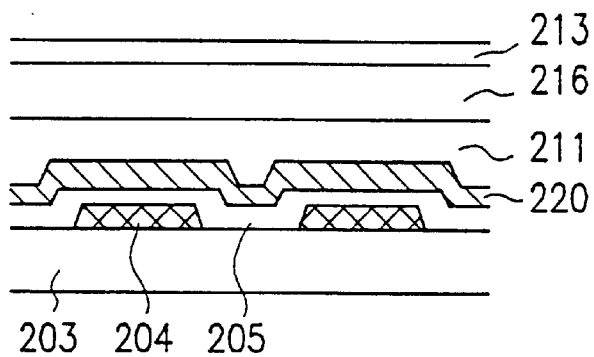
FIG. 13 is a cross-sectional view showing the peripheral region of the liquid crystal display device shown in FIG. 11.

Also in Example 7, a light shielding region is formed on an active matrix substrate instead of forming a black mask on a counter substrate. FIG. 10A is a plan view showing the configuration of a display region of an active matrix substrate 201 of Example 7, and FIG. 10B is a cross-sectional view taken along a line 10B—10B in FIG. 10A. FIG. 11 is a plan view showing a peripheral region of the active matrix substrate 201 of Example 7, and FIG. 13 is a cross-sectional view showing the configuration of the peripheral region. FIGS. 11 and 13 show the case where a light shielding region 220 for shielding a region between gate lines 204 from light is provided in the peripheral region as an example.

In Example 7, as shown in FIGS. 11 and 13, an insulating film 205 is formed so as to cover the gate lines 204 in the peripheral region. The light shielding region 220 is formed on the insulating film 205 positioned above the gate lines 204. An interlayer insulating film 211 is provided on the light shielding region 220. In the display region, as shown in FIG. 10A, the gate lines 204 and the source lines 209 themselves function as light shielding regions.

As shown in FIG. 10B, a black mask is not formed on a glass substrate 213 of the counter substrate 202. Instead, a counter electrode 215 made of a transparent conductive film is formed on the glass substrate 213. In the case of color display, a color filter 214 is provided so as to be interposed between the glass substrate 213 and the counter electrode 215.

Hereinafter, with reference to FIGS. 10A, 10B, 11 and 13, a fabrication process of the active matrix substrate of Example 7 will be described.

A metal film serving as the gate lines 204 is deposited on an insulating substrate 203 made of glass or the like. Then, the metal film is patterned into a predetermined shape so as to form the gate lines 204. Simultaneously, a gate electrode 204a of a TFT is formed. The metal film can be made of Ta, Al, Cr, Mo, or the like. In Example 7, Ta is used as the material of the metal film. Subsequently, a gate insulating film 205, an intrinsic (hereinafter, referred to as i-type) semiconductor layer 206 and a channel protection layer 207 are successively formed. Thereafter, the channel protection layer 207 is patterned into a predetermined shape. Next, an $n^+$-Si layer 208 is deposited on the substrate 203. Then, the $n^+$-Si layer 208 and the i-type semiconductor layer 206 are patterned. Thereafter, the $n^+$-Si layer 208 is separated into two parts by etching on the top of the channel protection layer 207 as shown in FIG. 10B.

Subsequently, a source line 209 to be connected to a source electrode of the TFT and a drain electrode 210 to be connected to a drain of the TFT are formed. Like Example 4 described above, each of the source line 209 and the drain electrode 210 has a double-layered structure in Example 7. More specifically, the source line 209 includes a transparent conductive film 209a and a metal film 209b, and the drain electrode 210 includes a transparent conductive film 210a and a metal film 210b. The metal film serving as an upper layer 209b of the source line 209 and an upper layer 210b of the drain electrode 210 is provided on a region above the gate lines 204 and a region between the gate lines in the peripheral region. The metal layer serves as the light shielding region 220. The metal layer can be made of Ta, Al, Cr, Mo, or the like.

Next, an interlayer insulating film 211 is formed over the entire surface of the substrate 203. Then, a contact hole is formed through the interlayer insulating film 211. The drain electrode 210 of the TFT is connected to a pixel electrode 212 described below via this contact hole. In Example 7, the interlayer insulating film 211 is made of a photoresistive acrylic resin, and is formed to have a thickness of about 3 µm. The contact hole is formed through this interlayer insulating film 211. Subsequently, a transparent conductive film serving as the pixel electrodes 212 is deposited on the interlayer insulating film 211. The transparent conductive film is patterned into a predetermined shape so as to form a plurality of pixel electrodes 212 arranged in a matrix. In this manner, the active matrix substrate 201 is completed.

The counter substrate 202 is obtained by successively depositing the color filter 214 and the counter electrode 215 made of a transparent conductive film on the insulating substrate 213 made of glass, or the like.

Figure 15:
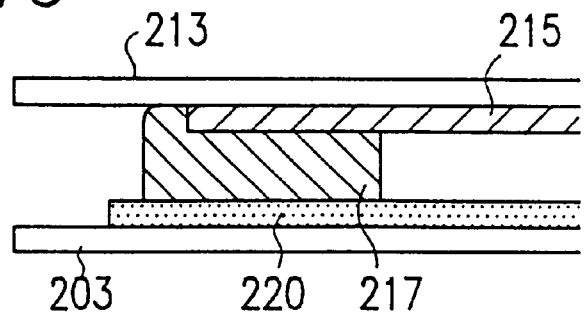
FIG. 15 is a cross-sectional view showing the region in a liquid crystal display device according to the present invention, to which a sealing resin is applied.

Alignment films (not shown) are formed on the respective surfaces of the thus obtained active matrix substrate 201 and the counter substrate 202. After performing an alignment treatment, the active matrix substrate 201 and the counter substrate 202 are attached to each other. More specifically, as shown in FIG. 15, the two substrates are attached to each other while a sealing resin 217 is applied to the surface of one of the substrates in such a way that covers the inward facing periphery of the sealing resin 217 (hereinafter, referred to as a sealing resin applied region) after the attachment of both substrates is completed. Thereafter, a liquid crystal material is sealed within a gap between the active matrix substrate 201 and the counter substrate 202, thereby forming a liquid crystal layer 216.

In Example 7, the light shielding region 220 is formed in the peripheral region of the active matrix substrate 201 as described above, and is protected by the insulating film 211. Even if the light shielding region 220 is formed so as to extend beyond the sealing resin applied region, the light shielding region 220 is not deteriorated by atmospheric moisture as occurs in a conventional configuration. Moreover, by forming the light shielding region 220 for shielding the peripheral region on the active matrix substrate 201 from light, it is no longer necessary to set a width of the light shielding region 220 at a predetermined width or wider, taking the assembly precision into consideration. Therefore, the outer size of the liquid crystal display device can be reduced. Furthermore, since the light shielding region 220 is made of a metal, the light shielding region 220 can have high reliability.

Figure 12:
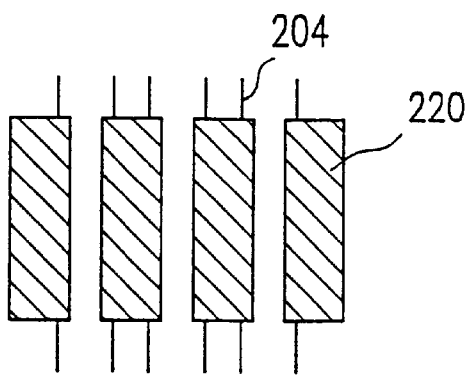
FIG. 12 is a plan view showing the configuration of the peripheral region of a liquid crystal display device of another example according to the present invention.
Figure 14:
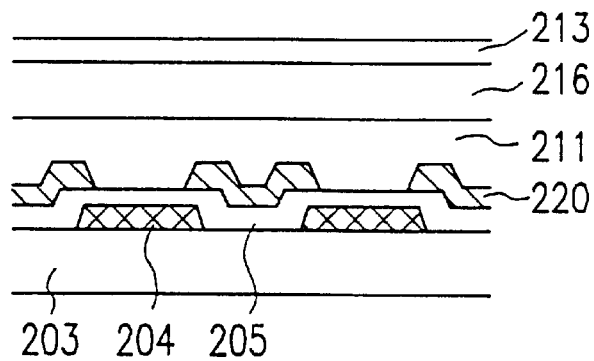
FIG. 14 is a cross-sectional view showing the peripheral region of the liquid crystal display device shown in FIG. 12.

In the above description, the light shielding region 220 for shielding a region between the gate lines 204 in the peripheral region from light is continuous so as to be positioned not only above the gate lines 204 but also between the gate lines 204 as shown in FIG. 11. However, the shape of the light shielding region 220 is not limited to this shape. Since the gate lines 204 themselves are made of a metal and have a light shielding function, it is sufficient that the light shielding region 220 is formed only on each region between the gate lines 204, which require to be shielded from light, for example, as shown in FIGS. 12 and 14.

A liquid crystal display device of Example 7 is described regarding the case where the light shielding region 220 is formed in the regions between the gate lines 204, which are required to be shielded from light. The regions between the source lines 209 in the peripheral region, which should be shielded from light, can be shielded in a similar manner. More specifically, for a region which should be shielded from light between the source lines 209 in the peripheral region, the metal layer common to the gate lines 204 is patterned so as to serve as a light shielding region. Since the metal layer is protected by the gate insulating film 205, the light shielding region is not deteriorated even when the light shielding region is provided so as to extend beyond the sealing resin applied region. Also in this case, the shape of the metal layer functioning as the light shielding region can have the shape other than those shown in FIGS. 11 and 13, for example, the shapes as shown in FIGS. 12 and 14.

In the aforementioned example, the light shielding region 220 between the gate lines 204 and a light shielding region (not shown) between the source lines 209 are formed by using respectively different films. However, these light shielding regions can be simultaneously formed by patterning the same film. In such a case, a metal film, which is electrically insulated from the upper layer 209b of the source line 209 and the pixel electrode 212, is formed above the source line 209.

The same signal as that applied to the counter electrode 215 can be applied across the light shielding region formed in the peripheral region. In the case where the potential of the counter electrode 215 and that of the light shielding region are set at the same level, the corrosion can be more efficiently prevented. This will be particularly efficient in the case where the metal layer serving as the light shielding region is formed on the interlayer insulating film 211.

Figure 16A:
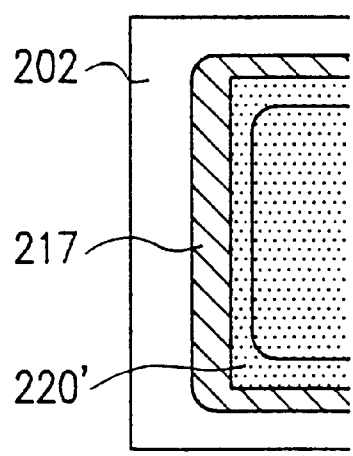
FIGS. 16A and 16B are plan views showing the configuration of the vicinity of a sealing resin applied region in a conventional liquid crystal display device.
Figure 16B:
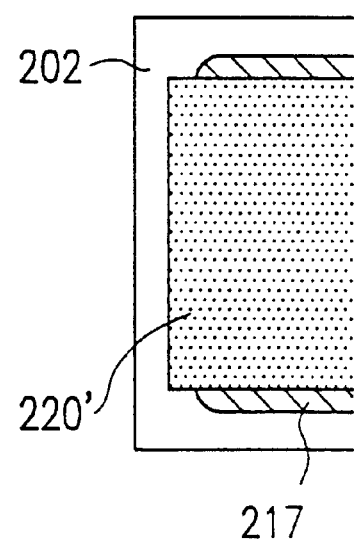
Figure 17:
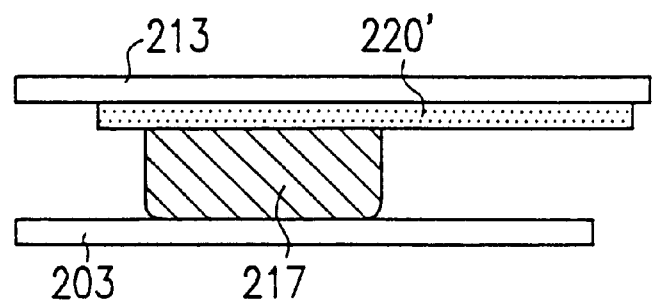
FIG. 17 is a cross-sectional view showing the configuration of the liquid crystal display device shown in FIG. 16B.

Table 1 below shows the result of assessment of 60° C. 95% operation aging in the case where the light shielding region 220 is formed so as to extend beyond the sealing resin applied region in the liquid crystal display device of Example 7. For comparison, the result of assessment of a conventional liquid crystal display device, in which a black mask is formed on a counter substrate, is also shown. The conventional liquid crystal display device herein used has such a configuration that the black mask 220' is formed so as to extend beyond the sealing resin applied region as shown in FIG. 16B for the purpose of reducing the outer size of the liquid crystal display device. FIG. 17 is a schematic view showing the cross-sectional configuration in the vicinity of the sealing resin applied region in the liquid crystal display device shown in FIG. 16B. FIG. 16A shows a conventional liquid crystal display device which is not particularly intended to reduce the frame region.

TABLE 1

| Test condition | 60° C. 95% operation aging | |
|---|---|---|
| Elapsed time [hour] | 22 | 500 |
| Conventional black mask configuration | Electric corrosion occurred | — |
| Example 7 | No problem | No problem |

As can be understood from Table 1, in the conventional liquid crystal display device, the part of the black mask 220', which is positioned outside the sealing resin applied region, electrochemically reacts with atmospheric moisture to cause the corrosion. As a result, part of the black mask 220' dissipates. Accordingly, the reduction of a frame region cannot be realized by forming the black mask 220' so as to extend beyond the sealing resin applied region in a conventional liquid crystal device. Meanwhile, in the liquid crystal display device of the present invention, the metal layer serving as the light shielding film is formed on the active matrix substrate, and is protected from atmospheric moisture, or the like, by the insulating film formed on the metal layer. Therefore, the liquid crystal display device of the present invention can perform a normal operation even after 500 hours.

As described above, since the light shielding region is formed on the active matrix substrate in the liquid crystal display device according to the present invention, the light leakage from the peripheral region of the display region can be prevented without forming a light shielding region in the peripheral region of the display region on the counter substrate. As a result, the fabrication process of the counter substrate can be simplified, resulting in reduction of the fabrication cost of the liquid crystal display device.

Furthermore, by forming the light shielding region on the active matrix, not on the counter substrate, it is possible to reduce the outer size of the liquid crystal display device. Furthermore, the light shielding region formed on the active matrix substrate is protected by the insulating film formed thereon. Thus, even when the light shielding region is provided so as to extend beyond the sealing resin applied region in the peripheral region, the corrosion, which occurs in the liquid crystal display device having the conventional configuration, does not occur.

EXAMPLE 8

First, the basic configuration of a liquid crystal display device of Examples 8 to 12 will be described.

Figure 18:
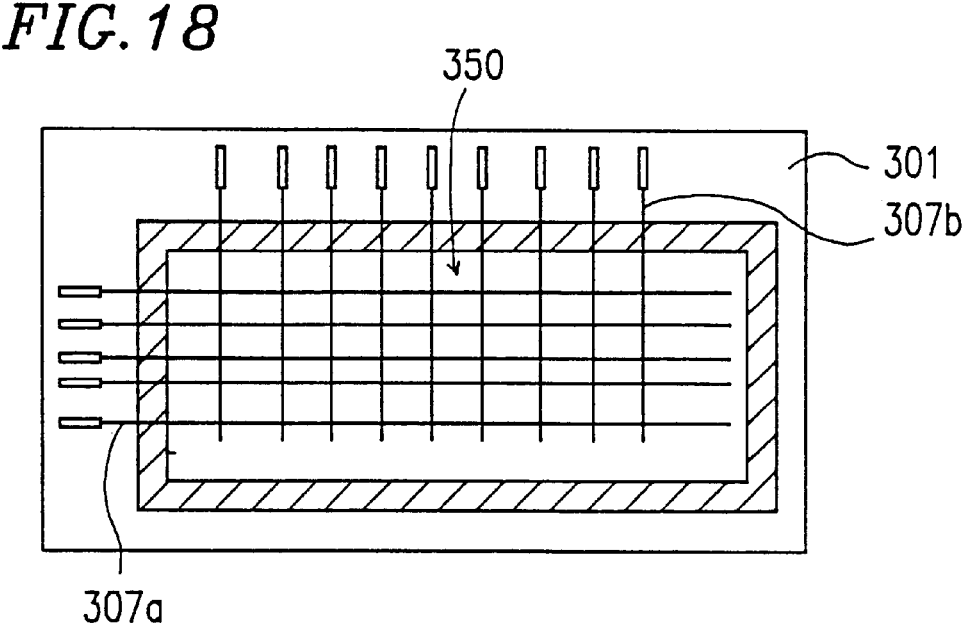
FIG. 18 is a plan view of an active matrix substrate of Examples 8 to 12, showing the portion where the present invention is applied.
Figure 19:
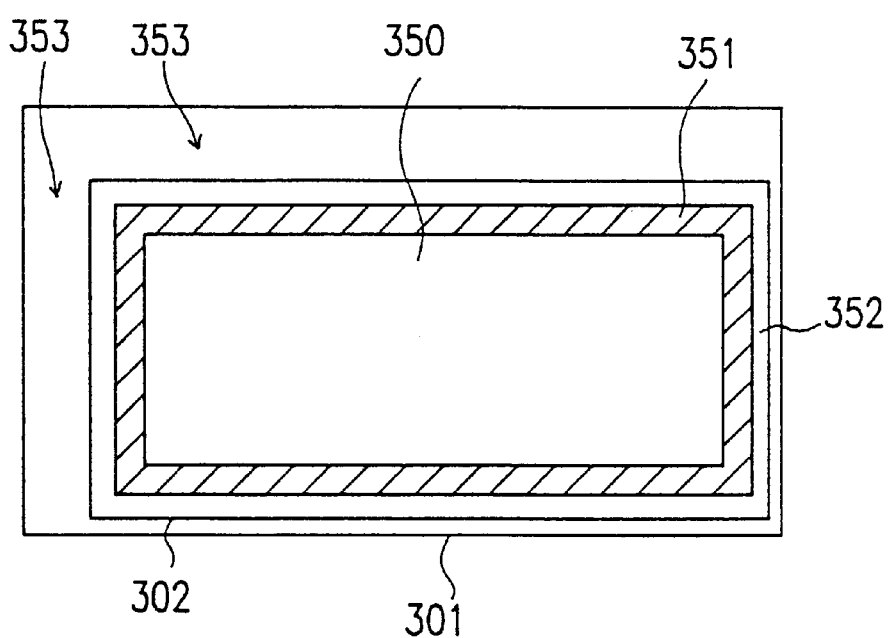
FIG. 19 is a plan view of a liquid crystal display device including the active matrix substrate and a counter substrate attached to each other, showing the portion where the present invention is applied.

FIGS. 18 and 19 show a portion where the configuration of the present invention is applied. FIG. 18 is a plan view showing an active matrix substrate 301, and FIG. 19 is a plan view in the case where the active matrix substrate 301 shown in FIG. 18 and a counter substrate 302 are attached to each other to form a liquid crystal display device.

In the attached state shown in FIG. 19, the liquid crystal display device has a peripheral region 351 surrounding a display region 350 and a sealing region 352 surrounding the peripheral region 351. In the sealing region 352, a sealing material for substantially attaching the active matrix substrate 301 and the counter substrate 302 to each other is present. The part of the active matrix substrate 301 projecting from the counter substrate 302 serves as a driver mounting region 353.

As shown in FIG. 18, the active matrix substrate 301 has the following configuration. In the region including at least the display region 350 and the peripheral region 351, a plurality of source lines 307b serving as signal lines are arranged in a parallel manner. A plurality of gate lines 307a serving as scanning lines are provided in a parallel manner so as to cross the source lines 307b, for example, in a perpendicular manner. A pixel electrode is provided in each region surrounded by the source line 307b and the gate line 307a. The pixel electrode may be provided in a Pixel on Passivation (hereinafter, referred to as POP) configuration. In the POP configuration, an interlayer insulating film is formed on the gate lines and the source lines 307b and TFTs 302 connected thereto over almost the entire surface of the substrate. The pixel electrode is formed on the interlayer insulating film, and is connected to a drain electrode of the TFT via a contact hole formed through the interlayer insulating film. Alternatively, the pixel electrode can be directly connected to the drain electrode without using the interlayer insulating film or the contact hole. In Examples 8 through 12, the components having the same functions are denoted by the same reference numerals.

Figure 20:
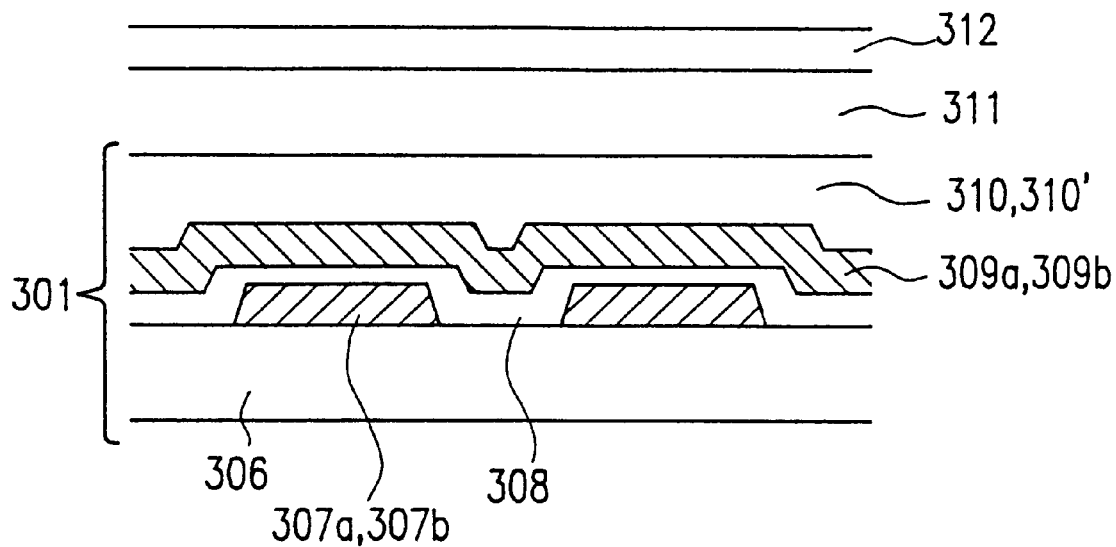
FIG. 20 is a cross-sectional view showing a liquid crystal display device of Example 8 according to the present invention.
Figure 21:
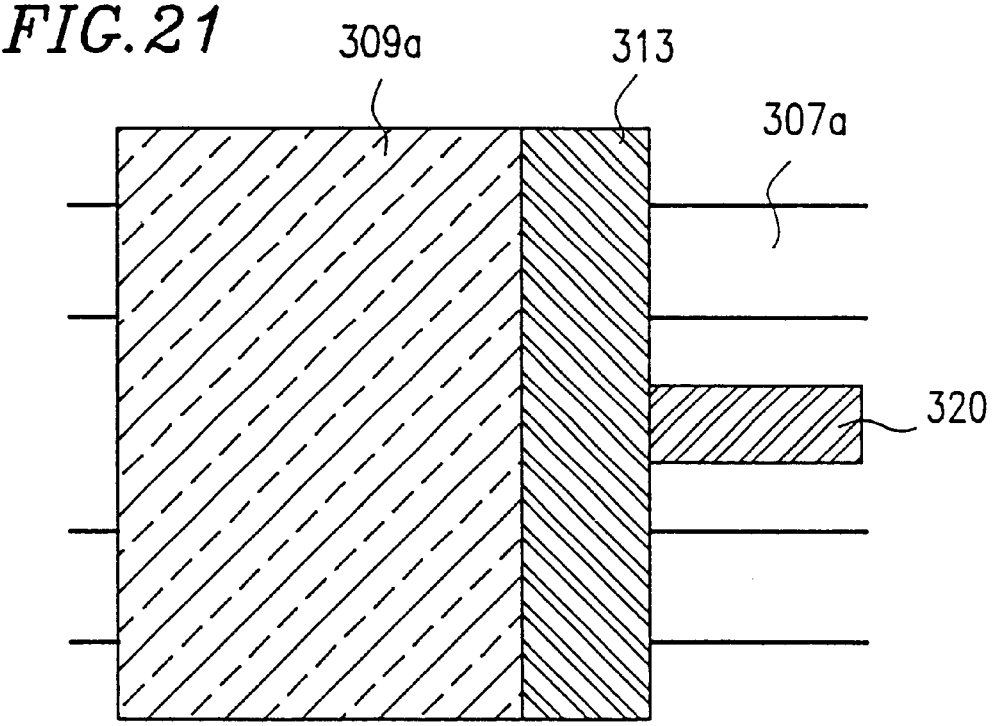
FIG. 21 is a plan view showing an active matrix substrate in the liquid crystal display device of Example 8 according to the present invention.
Figure 22:
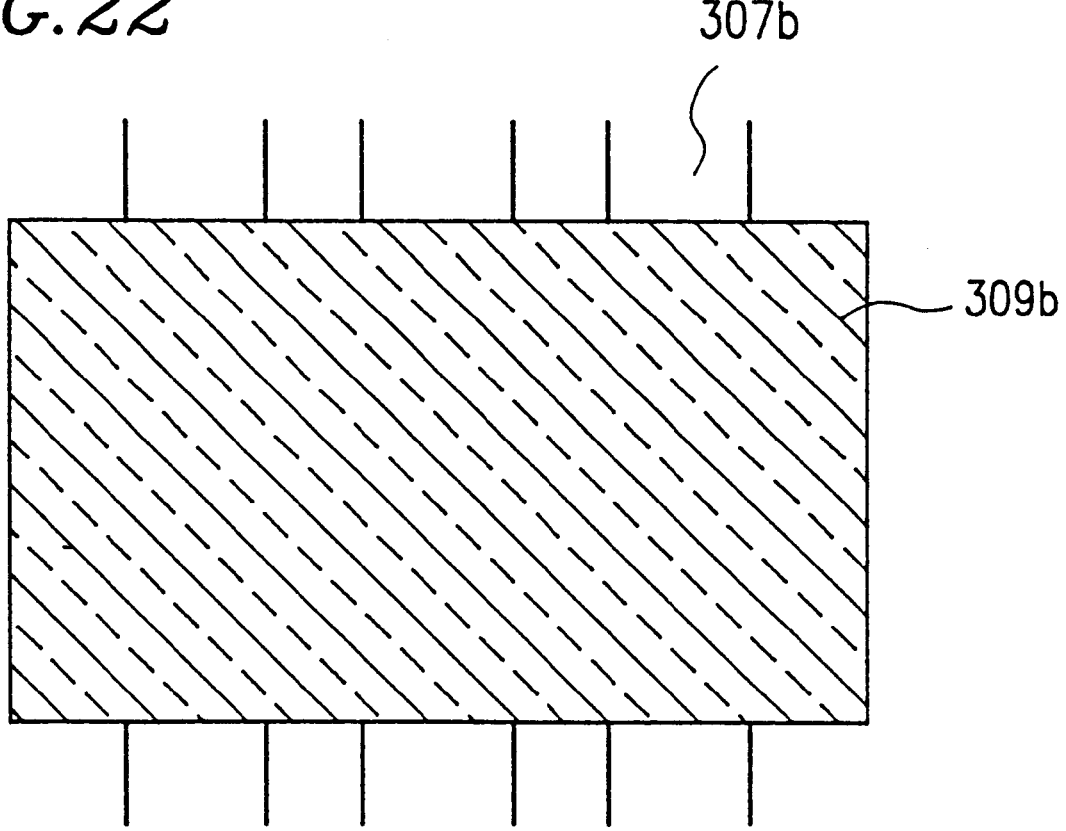
FIG. 22 is a plan view showing the active matrix substrate in the liquid crystal display device of Example 8 according to the present invention.

FIG. 20 is a cross-sectional view showing a liquid crystal display device of Example 8. FIGS. 21 and 22 are plan views showing the vicinity of a boundary region (corresponding to a edge region of a color filter) between the display region 350 and the peripheral region 351 thereof in the active matrix substrate included in the liquid crystal display device. FIGS. 21 and 22 (view from the bottom) show the left boundary region and the upper boundary region, respectively. FIGS. 20 to 22 show the regions corresponding to the edge region of a color filter. In FIG. 21, the left side is close to the edge of the substrate, and the right side is close to the display region.

Since the configuration of one pixel of the liquid crystal display device is the same as that shown in FIGS. 10A and 10B, the description thereof is herein omitted.

In this liquid crystal display device, the active matrix substrate 301 and a color filter (hereinafter, referred to as CF) substrate 312 are placed so as to face each other, interposing a liquid crystal layer 311 therebetween.

On the active matrix substrate, a plurality of gate lines 307a serving as scanning lines are provided. A plurality of source lines 307b serving as signal lines are formed so as to cross the gate lines 307a. A TFT is formed in the vicinity of the intersection of each gate line and each source line. The TFT is controlled to be switched ON/OFF by a gate signal transmitted through the gate line 307a. A source signal transmitted through the source line 307b is applied to the pixel electrode having the POP configuration described above. Upon application of the source signal, the pixel electrode performs a display. More specifically, the region in which the pixel electrodes are present serves as a display region. The gate lines 307a and the source lines 307b are provided so as to extend beyond the display region to be connected to a driving circuit provided in the periphery of the substrate 306.

The CF substrate 312 has such a configuration that a counter electrode and a CF which is not covered with a black mask are provided on a substrate made of glass or the like. The CF has layers of respective colors (i.e., RGB, for example) at the positions corresponding to the pixel electrodes present in the display region. The entire size of the CF is almost the same as that of the display region. Accordingly, the gate lines 307a and the source lines 307b are formed so as to extend beyond the region facing the region which is not covered with a black mask, that is, the outermost peripheral region of the CF.

In the active matrix substrate, a light shielding layer 309a is provided so as to cover the gate lines 307a and regions therebetween in the region where the gate lines 307a extend from the display region 350. A light shielding layer 309b is provided so as to cover the source lines 307b and regions therebetween in the region where the source lines 307b extend from the display region 350. An insulating film 308, which is formed in the same step for forming a gate insulating film covering a gate electrode of a TFT, is provided between the gate lines 307a and the light shielding layer 309a and between the source lines 307b and the light shielding layer 309b in the region where the gate lines 307a and the source lines 307b extend from the display region 350. The part of the active matrix substrate facing the outermost peripheral region of the CF is present within the width of the light shielding layers 309a and 309b.

An interlayer insulating film 310 or an insulating film 310' made of a photosensitive resin is provided on the light shielding layers 309a and 309b. The interlayer insulating film 310 and the insulating film 310' are formed in the same step. The interlayer insulating film 310 insulates the pixel electrodes from a conductive member such as the gate line 307a and the source line 307b provided in the display region. The TFT and the pixel electrode are electrically connected to each other via a contact hole formed through the interlayer insulating film 310. The insulating film 310' is provided so as to insulate the light shielding layers 309a and 309b from the other conductive elements.

Figure 35:
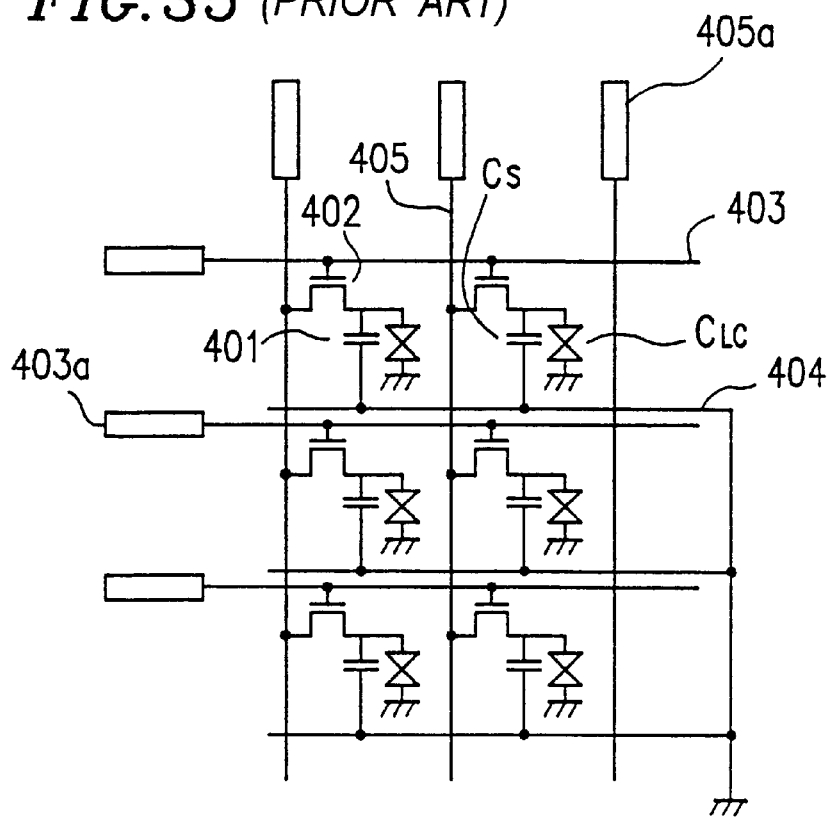
FIG. 35 is an equivalent circuit diagram of a conventional liquid crystal display device.
Figure 36:
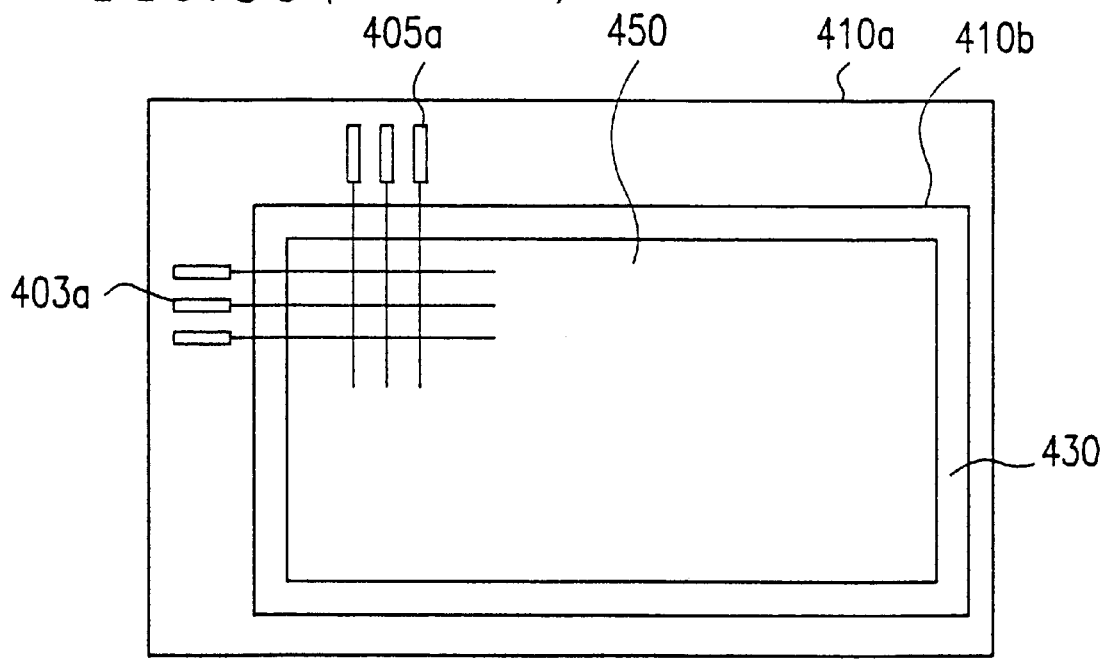
FIG. 36 is a plan view showing the liquid crystal display device shown in FIG. 35.

A common line (i.e., storage capacitor counter electrode, hereinafter referred to as a $C_S$ line) 320 having a $C_S$ on Common configuration is formed on the active matrix substrate. In the $C_S$ on Common configuration, a storage capacitor counter electrode, which serves as one of the electrodes of a storage capacitor $C_S$ provided so as to be parallel to a liquid crystal capacitor $C_{LC}$, functions as a common line for each of the gate lines (i.e., for each row) (See FIG. 35). The $C_S$ line 320 forms a storage capacitor with the pixel electrode. The $C_S$ lines 320 extend toward the peripheral region of the substrate, and are connected to each other through a $C_S$ main line 313 formed by patterning simultaneously with the formation of the source lines 307b. The same signal that applied to the counter electrode is applied to the $C_S$ main line 313. As shown in FIG. 21, the light shielding layer 309a is formed so as to be in contact with the $C_S$ main line 313. Therefore, the same signal that applied to the counter electrode is applied to the light shielding layer 309a.

In the thus configured liquid crystal display device according to Example 8, since the light shielding layers 309a and 309b are formed so as to entirely cover the gate signal lines 307a and the source lines 307b in the outer peripheral region of the CF which is not covered with the black mask, the light leakage from this region can be prevented. Moreover, the gate lines 307a and the source lines 307b are provided so as to cover a region between the adjacent pixel electrodes. Therefore, even if the black mask is omitted between the color layers included in the CF each being provided so as to face the pixel electrode, the light leakage from the region between the color layers can be prevented by the gate lines 307a and the source lines 307b.

EXAMPLE 9

Figure 23:
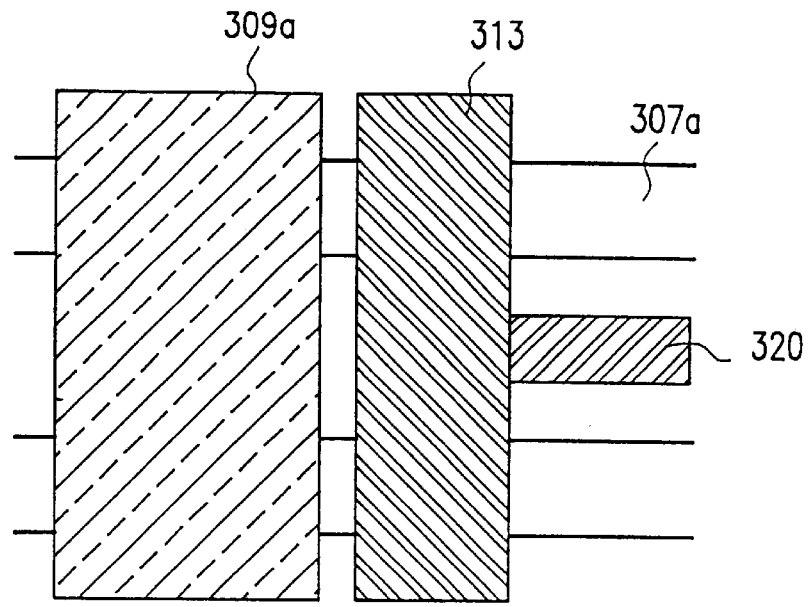
FIG. 23 is a plan view showing an active matrix substrate of a liquid crystal display device of Example 9 according to the present invention.

FIG. 23 is a plan view showing the vicinity of the boundary between the display region and the peripheral region (i.e., the region corresponding to the peripheral edge of a color filter) in the active matrix substrate of the liquid crystal display device of Example 9. FIG. 23 shows the peripheral region of the substrate of the active matrix substrate; the left side is close to the edge of the substrate, and the right side is close to a display region (not shown in FIG. 23).

In the liquid crystal display device of Example 9, a slit is provided between the light shielding layer 309a and the $C_S$ main line 313 to which the same signal as that applied to the counter electrode is applied. More specifically, the light shielding layer 309a is provided separately from the $C_S$ main line 313 so as to be in an insulated state. The other configuration of Example 9 is the same as that of Example 8.

Figure 24:
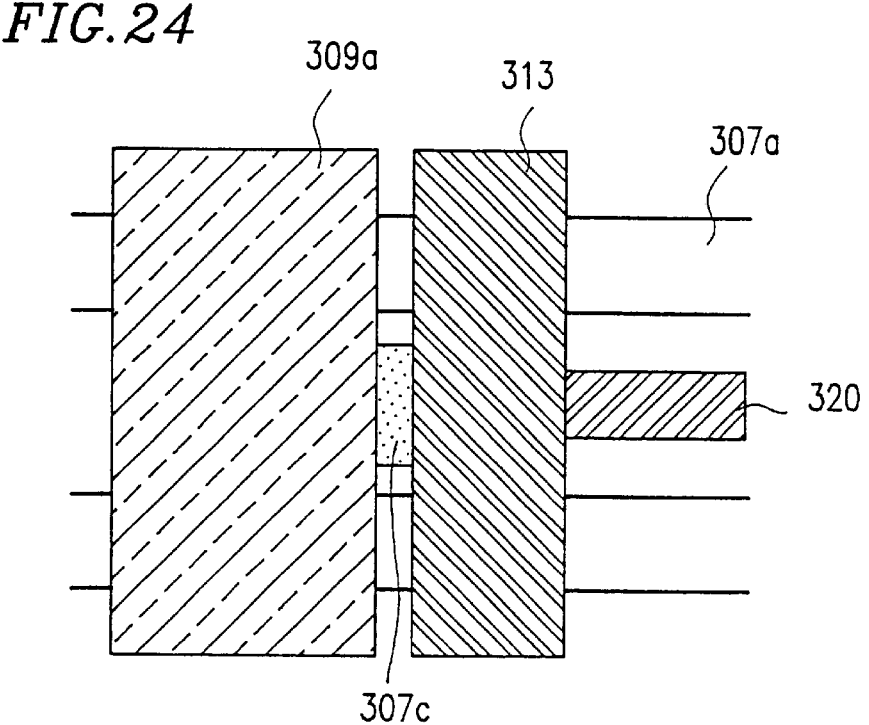
FIG. 24 is a plan view showing the active matrix substrate of the liquid crystal display device of Example 9 according to the present invention.

Although light leaks from the slit portion in an actual lighting state to perform a display in this liquid crystal display device, the amount of light leakage is minute. Furthermore, by forming another light shielding layer 307c so as to fill in the slit portion as shown in FIG. 24, the amount of light leakage can be further reduced.

A good display state is obtained with this liquid crystal display device because a capacity coupling between the gate line 307a and the light shielding layer 309a is almost halved as compared with the liquid crystal display device of Example 8 in which the same signal as that applied to the counter electrode is applied to the light shielding layer 309a. A leakage defect occurring between the gate line 307a and the source line 307b and light shielding layers 309a and 309b can be reduced, resulting in an improved yield.

EXAMPLE 10

Figure 25:
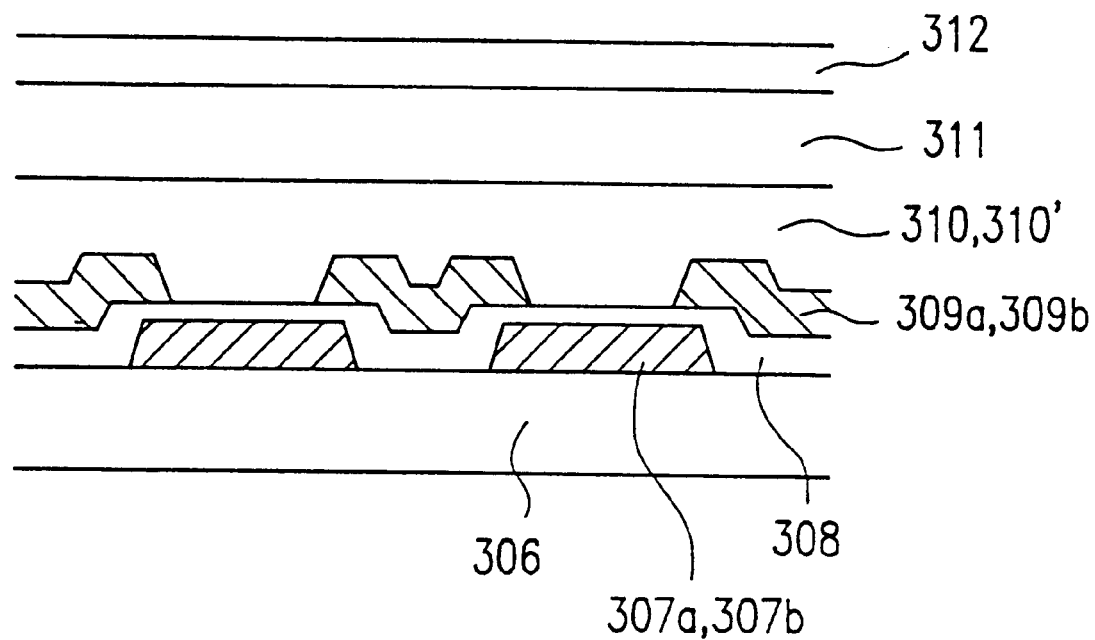
FIG. 25 is a cross-sectional view showing a liquid crystal display device of Example 10 according to the present invention.
Figure 26:
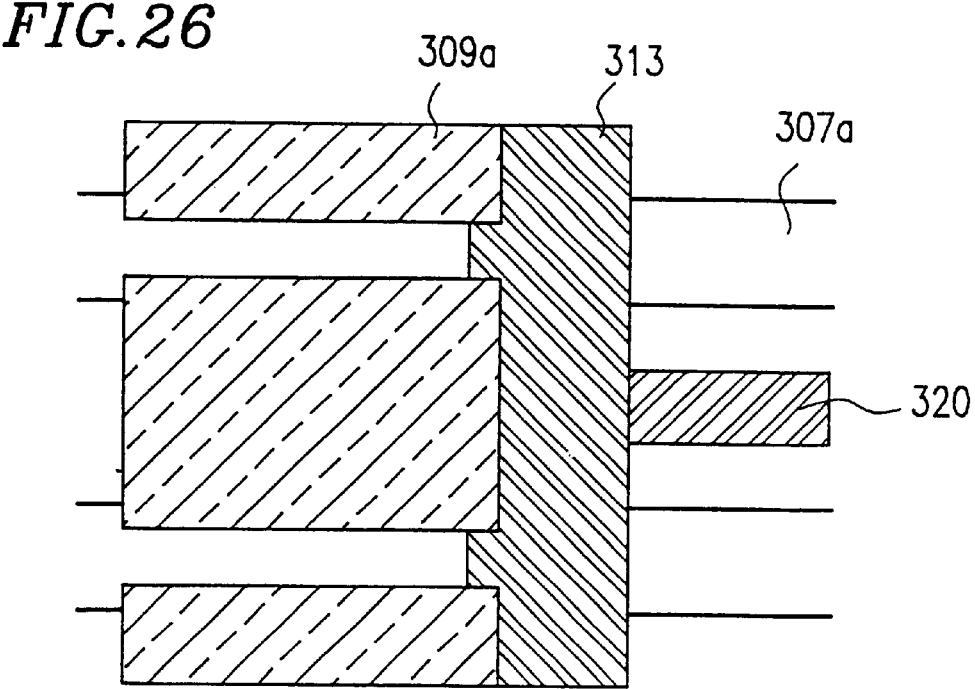
FIG. 26 is a plan view showing an active matrix substrate of a liquid crystal display device of Example 10 according to the present invention.
Figure 27:
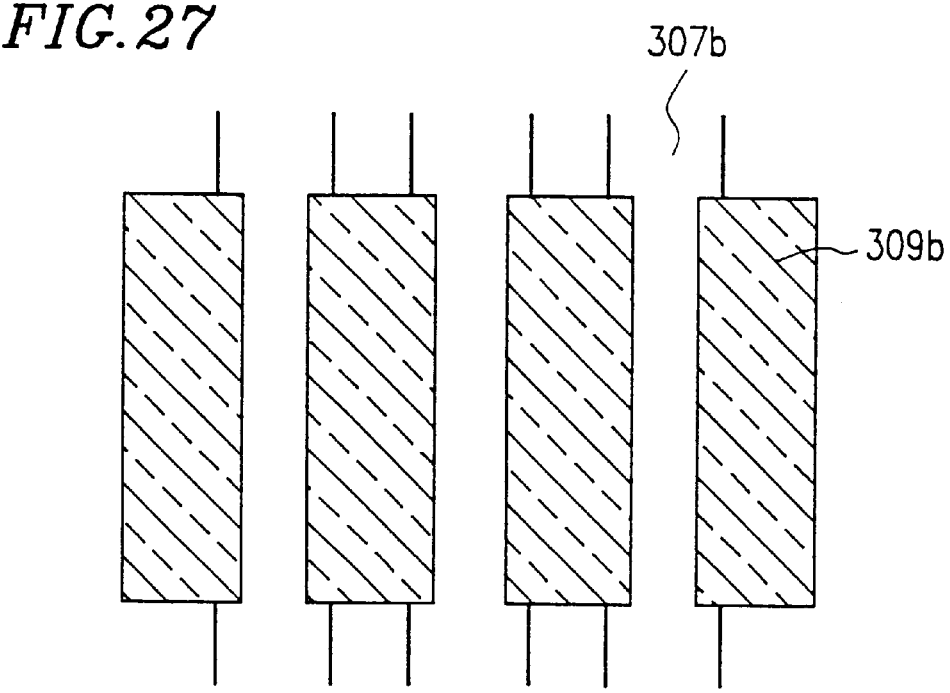
FIG. 27 is a plan view showing the active matrix substrate of the liquid crystal display device of Example 10 according to the present invention.

FIG. 25 is a cross-sectional view of a liquid crystal display of Example 10. FIGS. 26 and 27 are plan views showing the vicinity of the boundary between the display region and the peripheral region (i.e., the region corresponding to the peripheral region of a color filter) in the active matrix substrate constituting the liquid crystal display device. FIG. 26 and FIG. 27 (view from the bottom) show the left boundary region and the upper boundary region, respectively. Although the right and lower boundary regions are herein omitted, they have the similar configurations to those of FIGS. 26 and 27 from a reverse direction. FIGS. 25 to 27 show the regions corresponding to the peripheral region of the color filter. In FIG. 27, the left side is close to the end of the substrate, and the right side is close to the display region.

In the liquid crystal display device of Example 10, the light shielding layer 309a is formed so as to cover each region between the adjacent gate lines 307a and partially overlap the end portions of the gate lines 307a. In addition, the light shielding layer 309b is formed so as to cover each region between the adjacent source lines 307b and partially overlap the end portions of the source lines 307b. The other configuration is the same as that of Example 9.

In this liquid crystal display device, light is prevented from leaking from a region of the outermost periphery of the CF, which is not covered with a black mask, in an actual lighting state to perform a display.

Moreover, the overlapping portion between the light shielding layers 309a and 309b and the gate lines 307a and the source lines 307b is small in this liquid crystal display device as compared with that of the liquid crystal display device of Example 8. Accordingly, since a capacitance between the gate line 307a and the source line 307b and the light shielding layers 309a and 309b is reduced, a good display state is obtained. Furthermore, a leak defect between the gate line 307a and the source line 307b and the light shielding layers 309a and 309b is reduced as compared with the liquid crystal display device of Example 8, resulting in an improved yield.

EXAMPLE 11

Figure 28:
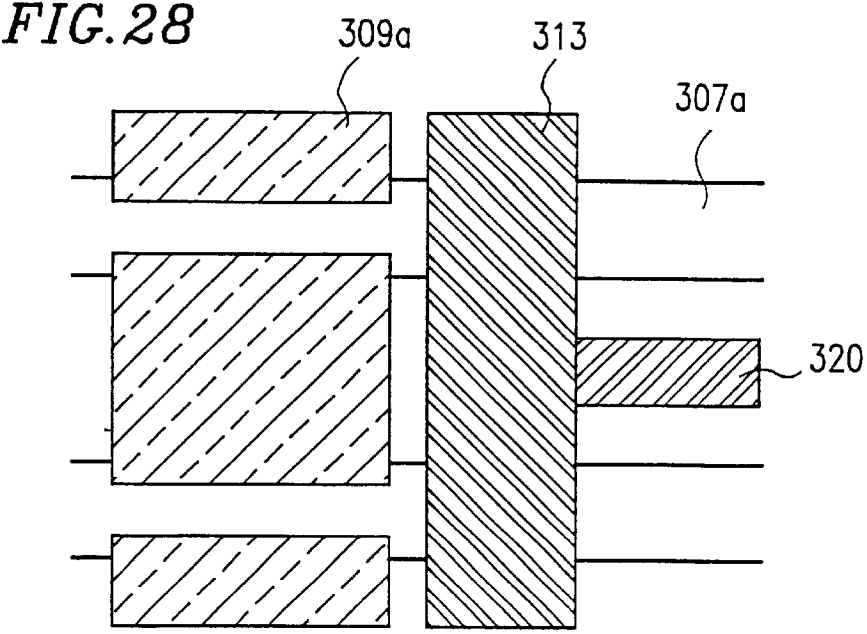
FIG. 28 is a plan view showing an active matrix substrate of a liquid crystal display device of Example 11 according to the present invention.

FIG. 28 is a plan view showing the vicinity of the boundary between a display region and a peripheral region (i.e., the region corresponding to the peripheral region of a color filter) in the active matrix substrate of a liquid crystal display device of Example 11. FIG. 28 shows the peripheral region of the active matrix substrate; the left side is close to the end of the substrate, and the right side is close to a display region (not shown).

In the liquid crystal display device of Example 11, the configuration of the liquid crystal display device of Example 9 is applied to that of Example 10. More specifically, a signal applied to the counter electrode is not applied to the light shielding layer 309a. A slit is provided between the light shielding layer 309a and the $C_S$ main line 313 so as to be separated from each other. The remaining configuration is the same as that of Example 10.

Figure 29:
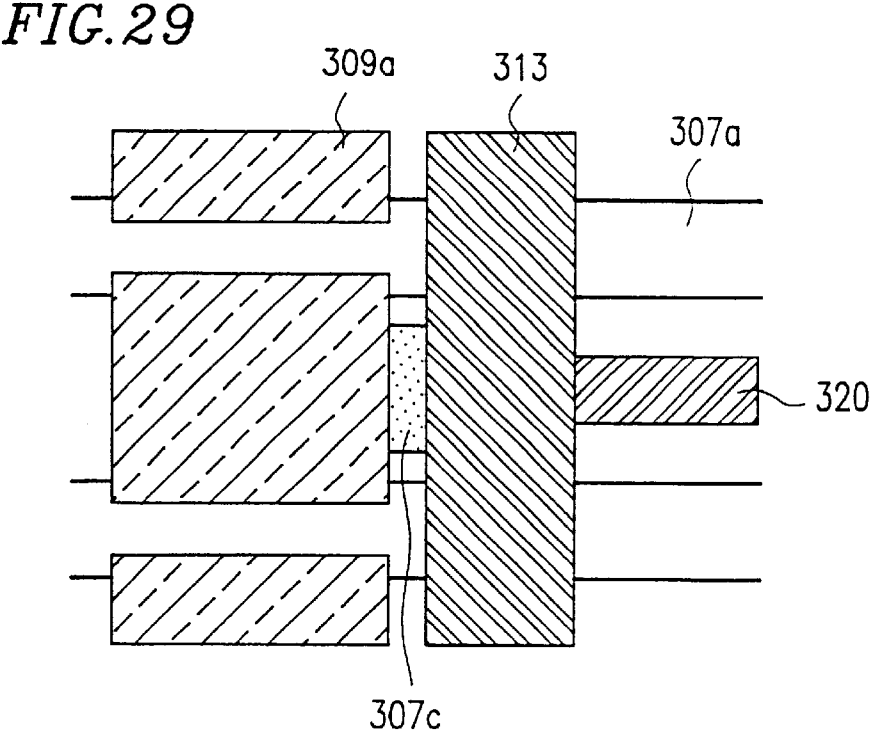
FIG. 29 is a plan view showing the active matrix substrate of the liquid crystal display device of Example 11 according to the present invention.

Although light leaks from the slit portion in an actual lighting state to perform a display in this liquid crystal display device, the amount of light leakage is minute. Furthermore, by forming another light shielding layer 307c so as to fill in the slit portion as shown in FIG. 29, the amount of light leakage can be further reduced.

In the liquid crystal display device of Example 11, a capacity coupling between the gate line 307a and the light shielding layer 309a can be reduced as compared with that of the liquid crystal display device of Example 10 in which the same signal as that applied to the counter electrode is applied to the light shielding layer 309a. Since a capacitance between the gate line 307a and the light shielding layers 309a and 309b and a capacitance between the source line 307b and the light shielding layer 309b is connected in series, the capacity coupling thereof is further halved. Furthermore, a leak defect occurs only when light leaks from two portions of the insulating film interposed between the gate line 309a and the light shielding layer 309a or two portions of the insulating film interposed between the source line 309b and the light shielding layer 309a. Since the probability of a leak defect between the gate line 307a and the source line 307b and the light shielding layers 309a and 309b occurring is low, an improved yield is attained.

EXAMPLE 12

Figure 30:
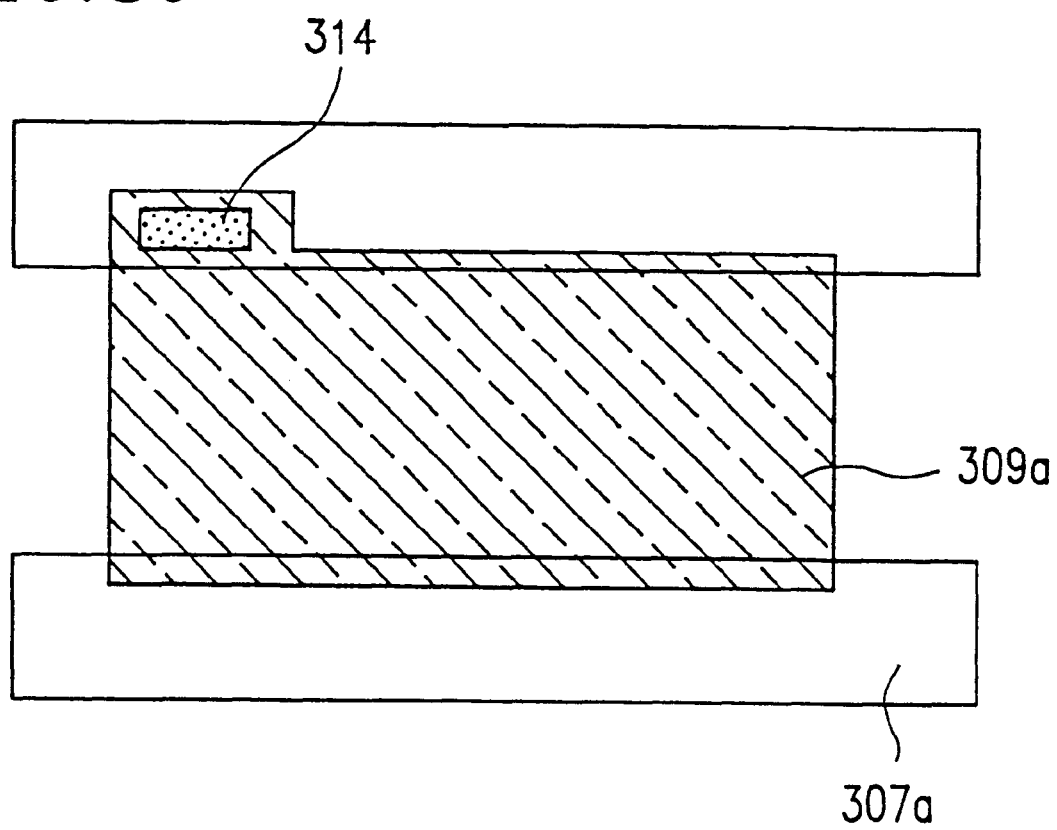
FIG. 30 is a plan view showing the active matrix substrate of a liquid crystal display device of Example 12 according to the present invention.

FIG. 30 is a plan view showing the vicinity of the boundary between a display region and a peripheral region (i.e., the region corresponding to the peripheral region of a color filter) in the active matrix substrate of a liquid crystal display device of Example 12. FIG. 30 shows the peripheral region of the active matrix substrate; the left side is close to the end of the substrate, and the right side is close to a display region (not shown).

In this liquid crystal display device, the light shielding layer 309a partially overlaps the gate lines 307a via the insulating film. The overlapping part is connected to the gate line 307a via a contact hole 314 formed through the insulating film. A signal transmitted through the corresponding gate line 307a is applied to the light shielding layer 309a. The other configuration is the same as that of Example 11.

In this liquid crystal display device, a capacity coupling between the gate line 307a and the light shielding layer 309a can be reduced as compared with the liquid crystal display devices of Examples of 8 and 10, in which the same signal as that applied to the counter electrode is applied to the light shielding layer 309a, and the liquid crystal display devices of Examples 9 and 11, in which no signal is applied to the light shielding layer 309a.

Although the portion overlapping the gate line 307a via the insulating film is provided for the light shielding layer in Example 12, the light shielding layer can instead have a portion overlapping the source line via the insulating film. The connection between the light shielding layer and the gate signal line, and between the light shielding layer and the source line is attained via the contact hole 314 formed through the insulating film in Example 12, the connection therebetween can be also attained through other connection means, for example, a lead line.

Figure 31:
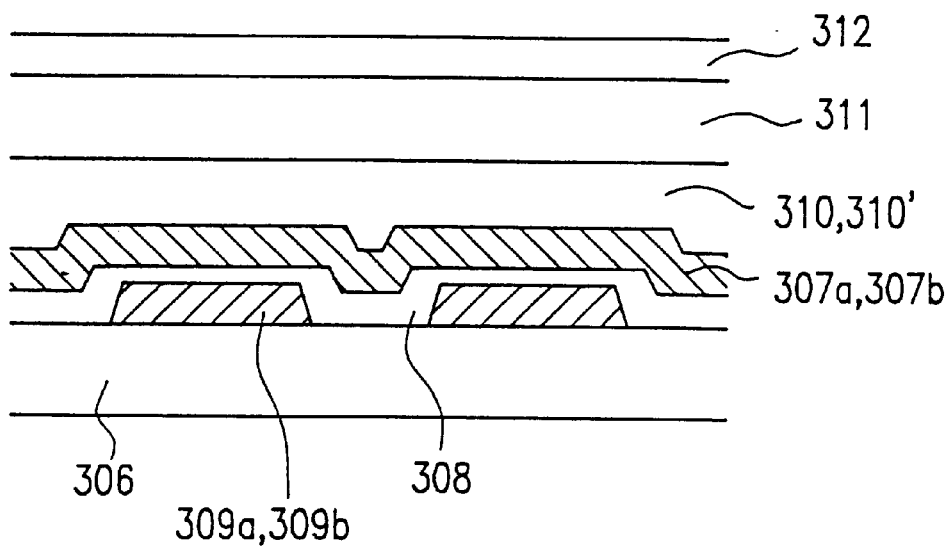
FIG. 31 is a cross-sectional view showing an embodiment of a liquid crystal display device according to the present invention.
Figure 32:
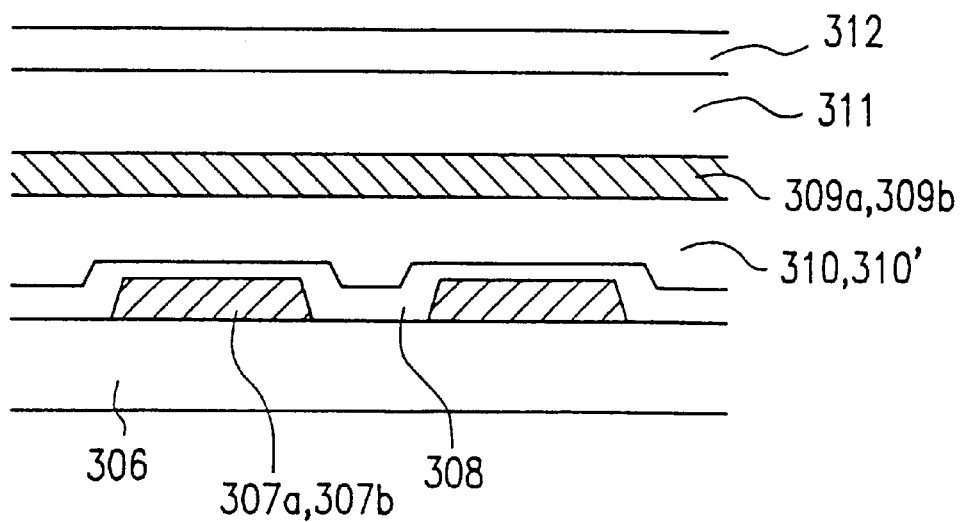
FIG. 32 is a cross-sectional view showing another embodiment of a liquid crystal display device according to the present invention.

Although the present invention has been described by way of examples described above, the present invention is not limited thereto. For example, as shown in FIG. 31, the source line 307b may be provided via the insulating film 308 so as to cover the light shielding layer 309b. Alternatively, as shown in FIG. 32, the light shielding layers 309a and 309b may be formed as layers different from the gate line 307a and the source line 307b.

Figure 33:
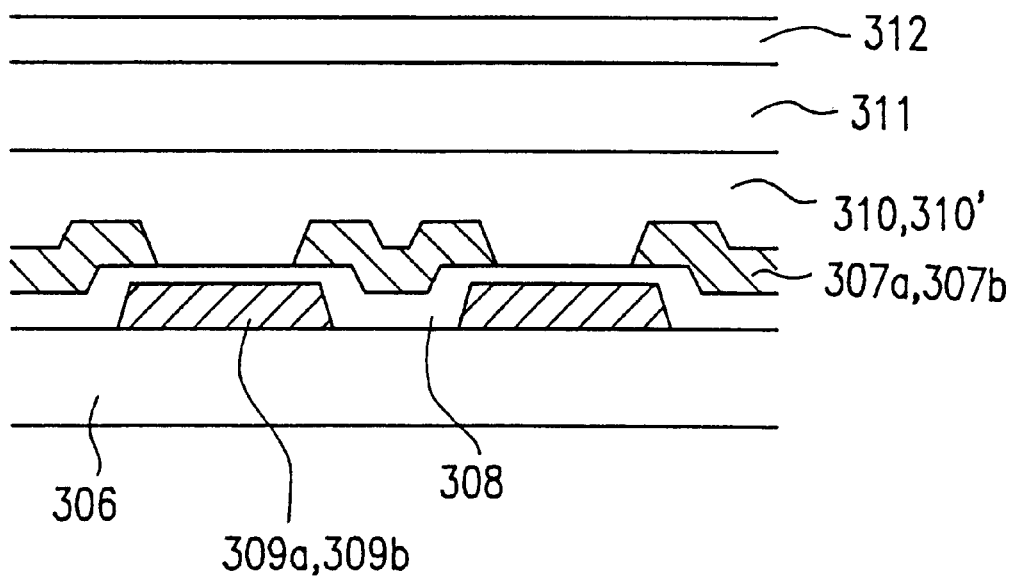
FIG. 33 is a cross-sectional view showing still another embodiment of a liquid crystal display device according to the present invention.
Figure 34:
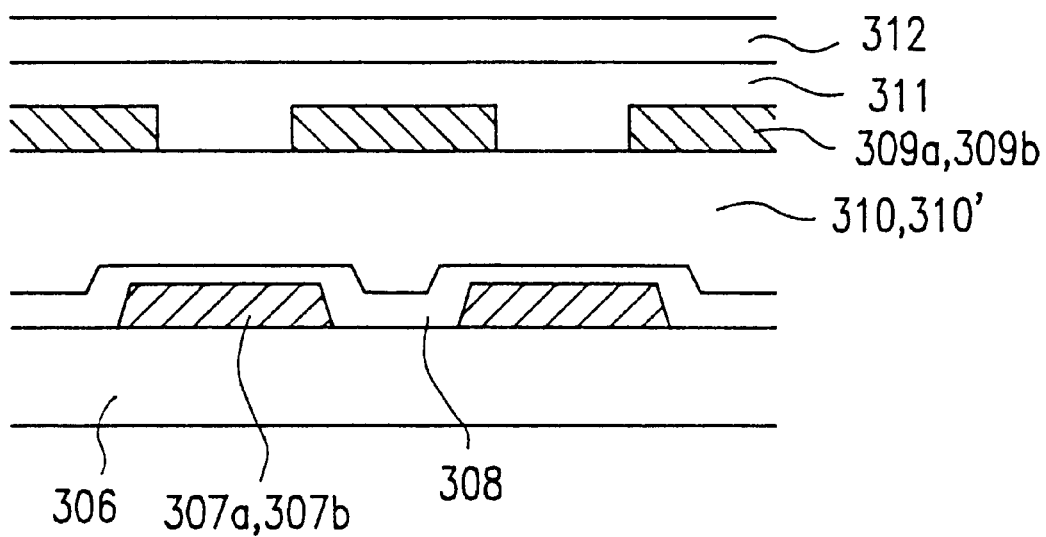
FIG. 34 is a cross-sectional view showing still another embodiment of a liquid crystal display device according to the present invention.

In the present invention, as shown in FIG. 33, the source line 307b may be provided via the insulating film 308 so as to partially overlap the adjacent light shielding layer 309b. Alternatively, as shown in FIG. 34, the light shielding layers 309a and 309b may be formed as layers different from the gate line 307a and the source line 307b.

Although a metal layer is used as a light shielding layer in the examples described above, a material of the light shielding layer of the present invention is not limited thereto. A material having light shielding properties other than a metal, for example, an acrylic resin or a polymer consisting of at least one of polyimide, polyamide imide, polyesterimide, polyamide and polyesteramide can be used as a material of the light shielding layer. If the used material is selected taking the conductivity into consideration, it is advantageous in that the insulation between the light shielding layer and the other members is not required to be strictly considered. However, the use of such a material may disadvantageously increase the number of fabrication steps. Furthermore, in the case where the same signal as that applied to the gate line and the source line or the counter electrode is applied to the light shielding layer, it is necessary to use a metal layer.

In Examples 10 and 11 described above, the light shielding layer is formed so as to cover a region between adjacent gate lines or source lines and the side end portions of the source lines. However, the configuration of the present invention is not limited thereto. The light shielding layer may be provided so as to cover only a region between adjacent gate lines or a region between adjacent source lines. The total number of light shielding layers may be reduced so that one light shielding layer cover three or more adjacent gate lines or source lines.

The reason that Examples 8 to 12 of the present invention are described only for the case where a $C_S$ main line is provided in a region where the gate lines are present is as follows. The widths of the gate line, the source line and the $C_S$ main line are in the range of about several $\mu$m to several tens of $\mu$m each, while the width of each of the light shielding layer is generally required to be in the range of 1 mm to several mm. Hence, the light shielding layer may be greatly affected by a storage capacitance as compared with the other parts. Since this problem should be solved, this configuration is described in the present invention as an example. However, this configuration can be also applied to the case where a $C_S$ main line is provided in the region where the source lines are present. Furthermore, it is apparent that this configuration is similarly applicable to a liquid crystal display device which does not include a $C_S$ line or a $C_S$ main line.

It is apparent that the present invention is applicable to a liquid crystal display device in which the boundary region and the outermost peripheral region of layers of RGB of a color filter are not covered with a black mask. The present invention is also applicable to a liquid crystal display device in which the boundary region of layers of RGB of a color filter except the outermost peripheral region is covered with a black mask.

Although the present invention has been described for the liquid crystal display device having a horizontally running rectangular shape, the present invention is not limited thereto. The present invention is also applicable to a liquid crystal display apparatus having any shape, for example, a vertically running rectangular shape. The arrangement of this liquid crystal display device is not limited to the above described examples although in the description of the examples of the invention the words "right side", "left side", "upper side", "lower side" and the like are used for easy understanding of the arrangement.

As is apparent from the above description, according to the present invention, since light leakage from a region between lines can be prevented in the outermost peripheral region of a color filter by a light shielding layer provided for one of the substrates, a good display state can be obtained. In the case where the light shielding layer merely partially overlaps the scanning line and the signal line, a further excellent display state can be obtained because a capacity coupling between the light shielding layer and the scanning line and signal line is reduced.

In the case where the light shielding layer overlaps the scanning line and the signal line via the insulating film and the potentials thereof are set to be identical, an excellent display state can be obtained because a capacity coupling between the light shielding layer and the scanning line and the signal line is reduced. Furthermore, a $C_S$ main line for connecting a $C_S$ line having a $C_S$ on Common configuration is present in the vicinity of the region where the light shielding layer is provided and the same potential as that applied to a counter electrode is applied across the light shielding layer, the light shielding layer can be provided so as to be in contact with or to overlap the $C_S$ main line. As a result, the light leakage from the region of the peripheral region of the substrate where lines are provided can be prevented. In the case where the same potential as that applied to the counter electrode is not applied to the light shielding layer, it is sufficient that the light shielding layer is provided so as to be separated from the $C_S$ main line. Also in this case, the amount of light leakage is minute. Furthermore, if another light shielding layer is provided in a region between the light shielding layer and the $C_S$ main line, the amount of light leakage can be further reduced. In the case where the light shielding layer is simultaneously patterned by using the same material as that of the signal line or the scanning line, a need of the separate step for forming a light shielding layer is eliminated. Therefore, since the fabrication process is simplified, a liquid crystal display device can be obtained at low cost.

As described above, according to the liquid crystal display device of the present invention, since the light leakage from the region in the periphery of the substrate in which lines are provided can be prevented without forming a black mask so as to cover the outer peripheral region of a color filter, the number of fabrication steps of the liquid crystal display device is reduced to lower the fabrication cost while attaining a good display state.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: an active matrix substrate; a counter substrate; and a liquid crystal layer interposed between the active matrix substrate and the counter substrate, wherein
   the active matrix substrate includes a plurality of switching elements, a plurality of pixel electrodes, gate lines for supplying control signals to the switching elements, and source lines for supplying data signals to the switching elements, the gate lines and the source lines crossing each other, and the pixel electrodes being connected to respective source lines through the switching elements,
   the counter substrate includes a counter electrode opposed to the plurality of pixel electrodes through the liquid crystal layer,
   the plurality of pixel electrodes, the counter electrode and the liquid crystal layer interposed therebetween form a plurality of pixel regions,
   the liquid crystal display device includes a display region including the plurality of pixel regions and a peripheral region surrounding the display region,
   the active matrix substrate includes a light shielding portion formed of a metal material in the peripheral region so as to substantially surround the display region,
   the light shielding portion includes a first light shielding portion formed separately from one of the gate lines or the source lines, and a second light shielding portion covering at least a part of a region between the first light shielding portion and the one of the gate lines or the source lines, and
   the second light shielding portion is made of a different material from that for the first light shielding portion and the one of the gate lines or the source lines.

2. A liquid crystal display device according to claim 1, wherein the second light shielding portion is made of the same material as the other one of the gate lines and the source lines.

3. A liquid crystal display device comprising: an active matrix substrate; a counter substrate; and a liquid crystal layer interposed between the active matrix substrate and the counter substrate, wherein
   the active matrix substrate includes a plurality of switching elements, a plurality of pixel electrodes, gate lines for supplying control signals to the switching elements, and source lines for supplying data signals to the switching elements, the gate lines and the source lines crossing each other, and the pixel electrodes being connected to respective source lines through the switching elements,
   the counter substrate includes a counter electrode opposed to the plurality of pixel electrodes through the liquid crystal layer,
   the plurality of pixel electrodes, the counter electrode and the liquid crystal layer interposed therebetween form a plurality of pixel regions,
   the liquid crystal display device includes a display region including the plurality of pixel regions and a peripheral region surrounding the display region,
   the active matrix substrate includes a light shielding portion formed of a metal material in the peripheral region so as to substantially surround the display region, and
   the light shielding portion is formed separately from at least one of the gate lines or the source lines, and a pixel electrode in an outermost region in the display region at least partially overlaps the light shielding portions.

4. A liquid crystal display device according to claim 3, wherein an area surrounded by the gate lines and the source lines in the outermost pixel region in the display region is smaller than that of an area surrounded by the gate lines and the source lines in the pixel region in a remaining display region.

5. A liquid crystal display device according to claim 4, wherein an overlapping area between the outermost pixel electrode and the gate lines in the display region differs from an overlapping area between any one of the other pixel electrodes and the gate lines in the display region.

6. A liquid crystal display device according to claim 4, wherein a size of the switching element corresponding to the outermost pixel electrode in the display region differs from that of any one of the other switching elements.

7. A liquid crystal display device comprising: an active matrix substrate; a counter substrate; and a liquid crystal layer interposed between the active matrix substrate and the counter substrate, wherein
   the active matrix substrate includes a plurality of switching elements, a plurality of pixel electrodes, gate lines for supplying control signals to the switching elements, and source lines for supplying data signals to the switching elements, the gate lines and the source lines crossing each other, and the pixel electrodes being connected to respective source lines through the switching elements,
   the counter substrate includes a counter electrode opposed to the plurality of pixel electrodes through the liquid crystal layer,
   the plurality of pixel electrodes, the counter electrode and the liquid crystal layer interposed therebetween form a plurality of pixel regions,
   the liquid crystal display device includes a display region including the plurality of pixel regions and a peripheral region surrounding the display region, the active matrix substrate includes a light shielding portion formed of a metal material in the peripheral region so as to substantially surround the display region, and the light shielding portion is formed in a single body including one of the gate lines or the source lines in an outermost region in the display region, and the outermost pixel region in the display region conducts a black display.

8. A liquid crystal display device comprising: an active matrix substrate; a counter substrate; and a liquid crystal layer interposed between the active matrix substrate and the counter substrate, wherein the active matrix substrate includes a plurality of switching elements, a plurality of pixel electrodes, gate lines for supplying a control signal to the switching elements, source lines for supplying data signals to the switching elements, the gate lines and the source lines crossing each other, and the pixel electrodes being connected to the respective source lines through the switching elements, the counter substrate includes a counter electrode opposed to the plurality of pixel electrodes through the liquid crystal layer, the plurality of pixel electrodes, the counter electrodes and the liquid crystal layer interposed therebetween form a plurality of pixel regions, the liquid crystal display device includes a display region including the plurality of pixel regions and a peripheral region surrounding the display region, the counter substrate includes a color filter layer without a black matrix at least in an outermost region of the display region, and wherein the peripheral region of the active matrix substrate includes a first light shielding layer covering at least a region between the gate lines, and a second light shielding layer covering at least a region between the source lines.

9. A liquid crystal display device according to claim 8, wherein the first light shielding layer is provided so as to partially overlap the gate lines while the second line shielding layer is provided so as to partially overlap the source lines.

10. A liquid crystal display device according to claim 8, wherein the first light shielding layer and the second light shielding layer are provided so as to cover three or more of the adjacent gate lines or the adjacent source lines.

11. A liquid crystal display device according to claim 8, wherein the first light shielding layer and the second light shielding layer are made of a conductive metal, wherein the first light shielding layer has a portion overlapping the gate lines via an insulating layer, and the first light shielding layer and the gate lines have the same potential, and wherein the second light shielding layer has a portion overlapping the source lines via an insulating layer, and the second light shielding layer and the source lines have the same potential.

12. A liquid crystal display device according to claim 11, further comprising: a plurality of liquid crystal capacitors formed by the plurality of pixel electrodes, the counter electrode and the liquid crystal layer interposed between the plurality of pixel electrodes and the counter electrode; and a plurality of storage capacitors connected to the respective liquid crystal capacitors in parallel, wherein a storage capacitor counter electrode forming each of the storage capacitors is provided so as to be parallel to the gate lines or the source lines while a storage capacitor common line is provided in the vicinity of a region opposed to an outermost region of the color filter layer included in the counter substrate, and at least part of the first light shielding layer and the second light shielding layer is in contact with at least the storage capacitor common line.

13. A liquid crystal display device according to claim 11, further comprising: a plurality of liquid crystal capacitors formed by the plurality of pixel electrodes, the counter electrode and the liquid crystal layer interposed between the plurality of pixel electrodes and the counter electrode; and a plurality of storage capacitors connected to the respective liquid crystal capacitors in parallel, wherein a storage capacitor counter electrode forming each of the storage capacitors is provided so as to be parallel to the gate lines or the source lines while a storage capacitor common line is provided in the vicinity of a region opposed to an outermost region of the color filter layer included in the counter substrate, and the first light shielding layer and the second light shielding layer are provided independently of the storage capacitor common line.

14. A liquid crystal display device according to claim 13, further comprising a third light shielding layer in a region between one of the first light shielding layer or the second light shielding layer and the storage capacitor common line.

15. A liquid crystal display device according to claim 8, wherein the first light shielding layer is formed simultaneously with formation of the source lines using the same material as for the source lines while the second light shielding layer is formed simultaneously with formation of the gate lines using the same material as for the gate lines.

* * * * *